United States Patent
Pyun et al.

(10) Patent No.: US 8,782,902 B2
(45) Date of Patent: Jul. 22, 2014

(54) METHOD OF MAKING BEARING USING ULTRASONIC NANO CRYSTAL SURFACE MODIFICATION TECHNOLOGY

(75) Inventors: Young Sik Pyun, Asan-si (KR); Jeong Hyeon Park, Cheonan-si (KR); Chang Sik Kim, Chung Nam (KR); In Ho Cho, Cheonan-si (KR)

(73) Assignee: Designmecha Co., Ltd., Asan-Si (KR)

( * ) Notice: Subject to any disclaimer, the term of this patent is extended or adjusted under 35 U.S.C. 154(b) by 816 days.

(21) Appl. No.: 12/578,517

(22) Filed: Oct. 13, 2009

(65) Prior Publication Data
US 2010/0024218 A1 Feb. 4, 2010

Related U.S. Application Data

(63) Continuation-in-part of application No. PCT/KR2008/003006, filed on May 29, 2008.

(30) Foreign Application Priority Data

May 14, 2008 (KR) .................. 10-2008-0044506

(51) Int. Cl.
*B23P 17/00* (2006.01)
(52) U.S. Cl.
USPC .............. 29/898.13; 29/898.14; 451/165
(58) Field of Classification Search
USPC .......... 29/898.13, 898, 898.01, 898.02, 29/898.03, 898.04, 898.14; 451/165; 700/160
See application file for complete search history.

(56) References Cited

U.S. PATENT DOCUMENTS

| | | | |
|---|---|---|---|
| 3,897,659 A | 8/1975 | Henry | |
| 6,036,578 A | 3/2000 | Sasaki | |
| 7,300,622 B2 | 11/2007 | Lu et al. | |
| 2005/0160602 A1* | 7/2005 | Shibata et al. | 29/898.066 |
| 2006/0237104 A1* | 10/2006 | Statnikov | 148/400 |
| 2007/0244595 A1* | 10/2007 | Statnikov et al. | 700/160 |

FOREIGN PATENT DOCUMENTS

| | | |
|---|---|---|
| DE | 10012445 A1 | 9/2001 |
| EP | 0354052 A2 | 2/1990 |
| GB | 2367028 A | 3/2002 |
| JP | 2004-169063 A | 6/2004 |
| JP | 2004-169104 A | 6/2004 |
| JP | 2006-104553 A | 4/2006 |
| JP | 2008-056100 A | 3/2008 |
| KR | 10-2002-0072928 A | 9/2002 |
| KR | 10-2006-0042185 A | 5/2006 |
| WO | 2004/028739 A1 | 4/2004 |

OTHER PUBLICATIONS

International Search Report dated Feb. 11, 2009 of PCT/KR2008/003006—2 pages.

(Continued)

*Primary Examiner* — David Bryant
*Assistant Examiner* — Ryan J Walters
(74) *Attorney, Agent, or Firm* — Knobbe Martens Olson & Bear, LLP

(57) ABSTRACT

A method of making a bearing includes providing a bearing intermediate, which is unfinished while having an overall shape of a finished bearing product; and repeatedly impacting a surface of the bearing intermediate at one or more ultrasonic frequencies to modify characteristics of the bearing intermediate. The resulting bearing intermediate or finished bearing product includes nano-size grains at or underneath the surface.

20 Claims, 27 Drawing Sheets

(56) References Cited

OTHER PUBLICATIONS

Written Opinion dated Feb. 11, 2009 of PCT/KR2008/003006—3 pages.

Y. B. Guo and C.R. Liu, Feb. 2002, "Mechanical Properties of Hardened AISI 52100 Steel in Hard Machining Processes", Journal of Manufacturing Science and Engineering, vol. 124, pp. 1-9.

European Search Report dated May 8, 2012 of corresponding European Patent Application No. 08753709—6 pages.

Office Action dated Mar. 12, 2013 of corresponding Japanese Patent Application No. 2011-509392—4 pages.

* cited by examiner (a)   (b)

Figure 6
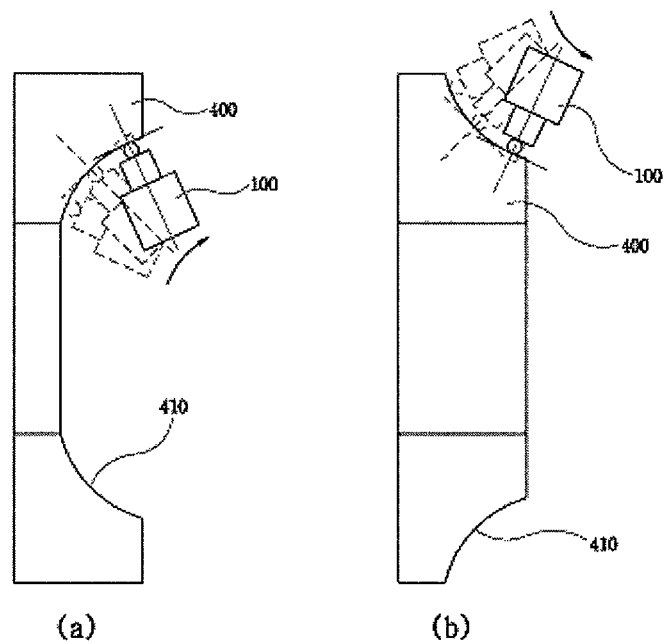
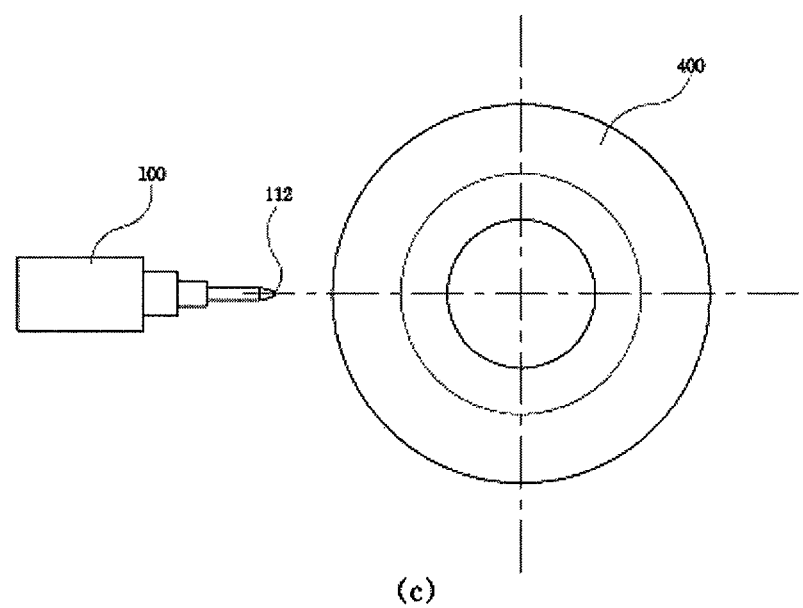

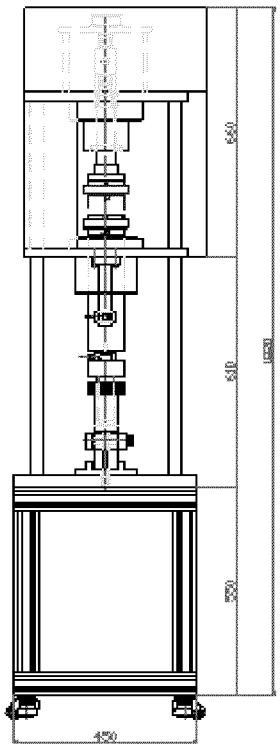 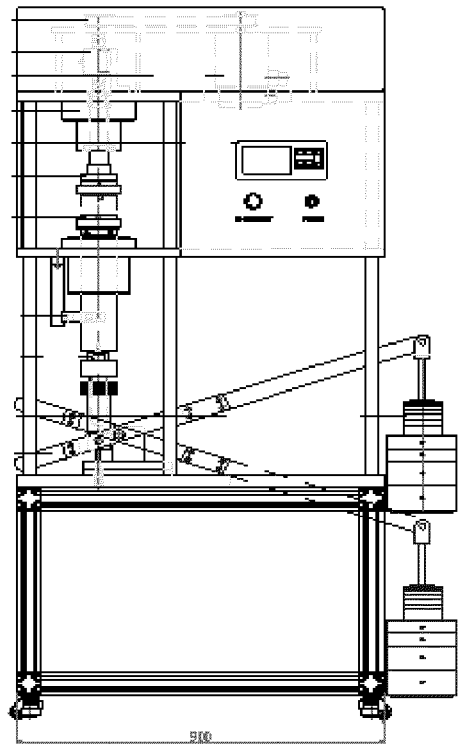
Fig. 15A　　　　　　　　　Fig. 15B
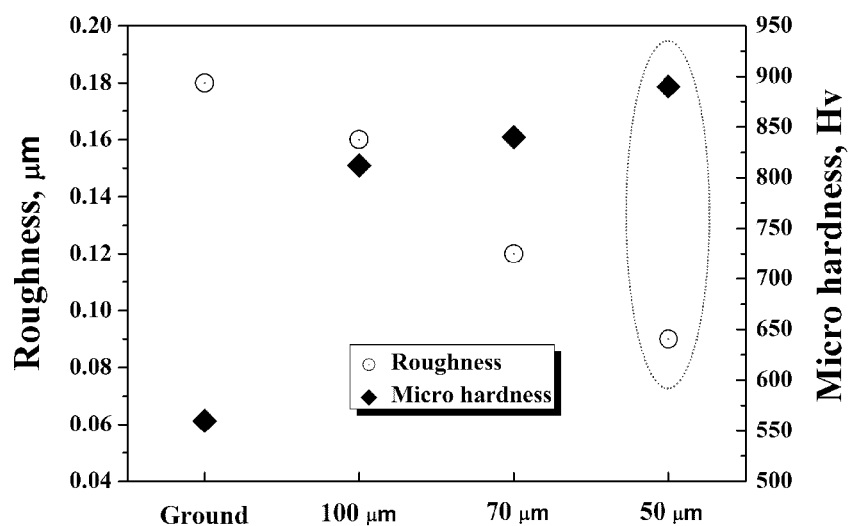
Fig. 16

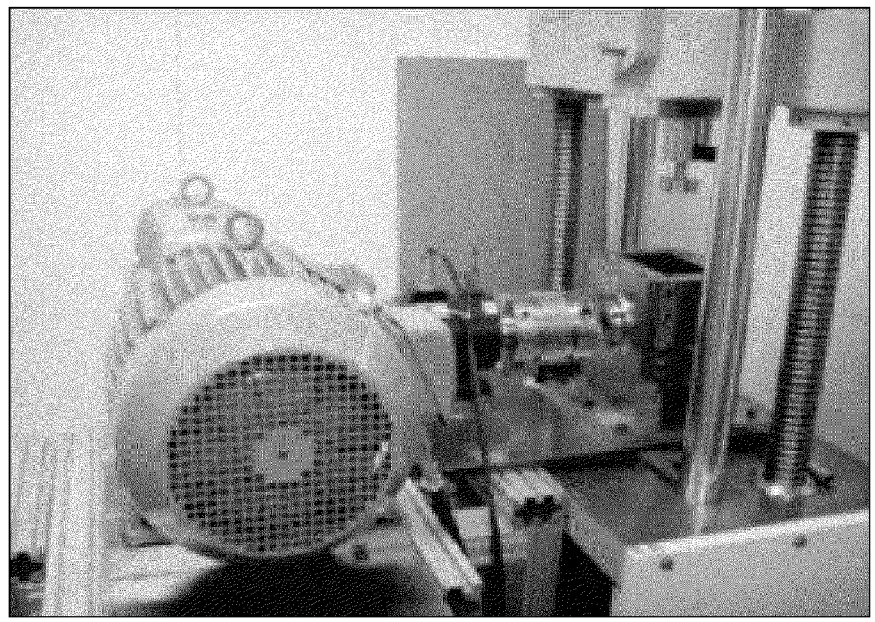
Fig. 22
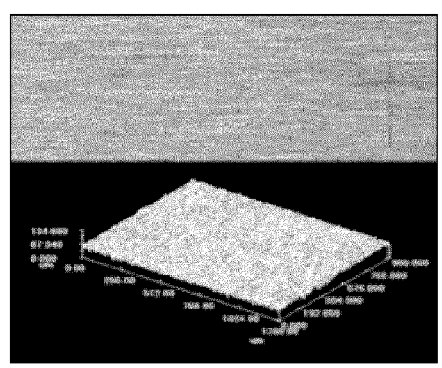 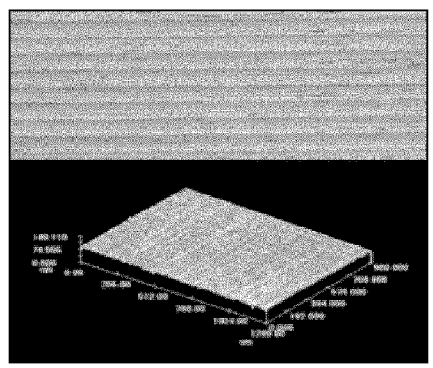
Fig. 23A                                    Fig. 23B

 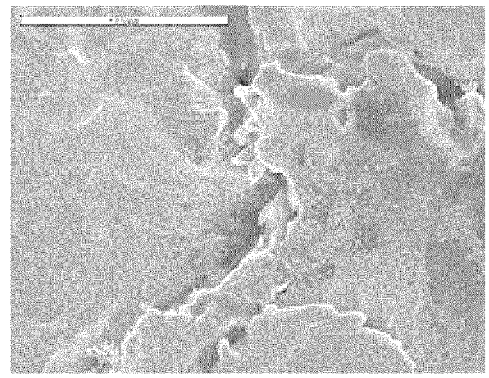
Fig. 39C                    Fig. 39D
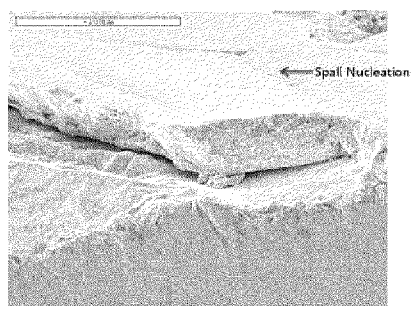 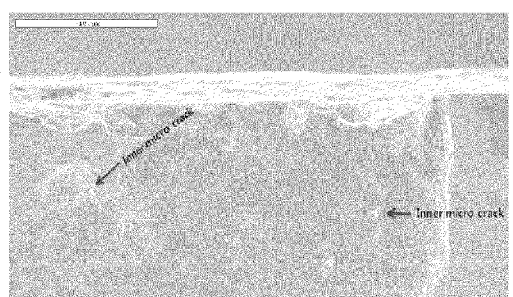
Fig. 40A                    Fig. 40B
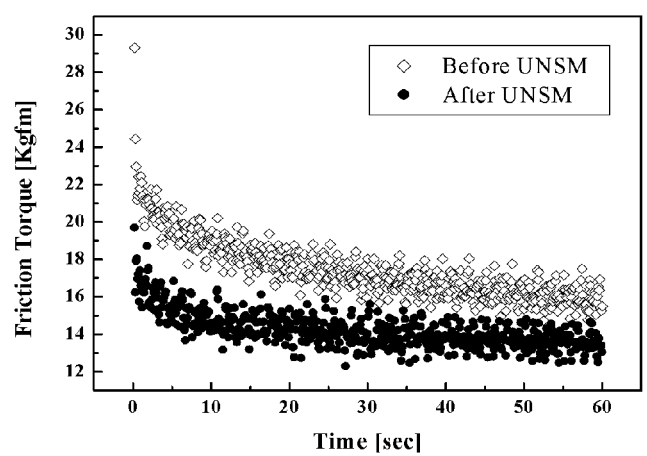
Fig. 41

METHOD OF MAKING BEARING USING ULTRASONIC NANO CRYSTAL SURFACE MODIFICATION TECHNOLOGY

RELATED APPLICATIONS

This application is a continuation in part application under 35 U.S.C. §365(c) of International Application No. PCT/KR2008/003006, filed May 29, 2008 designating the United States. This application further claims the benefit of the earlier filing date under 35 U.S.C. §365(b) of Korean Patent Application No. 10-2008-0044506 filed May 14, 2008. This application incorporates herein by reference the International Application No. PCT/KR2008/003006 and the Korean Patent Application No. 10-2008-0044506 in their entirety.

BACKGROUND

1. Field

The present disclosure relates to a process of making a bearing using an ultrasonic nano crystal surface modification technology.

2. Discussion of the Related Art

A bearing refers to a mechanical element which fixes a shaft of a machine, which is rotating, in a predetermined position and rotates the shaft in support of a weight of the shaft and load imposed on the shaft. Since the bearing is rubbed, bent, twisted, sealed, or compressed due to high load and a high speed, the bearing requires high precision and strength. Therefore, various specific processing methods have been developed to increase life-spans and reduce friction losses of bearings.

Coating using physical vapor deposition (PVD) or chemical vapor deposition or ion implanting is used as a specific processing method for improving hardness of a bearing to reduce wear rate or a relative friction coefficient of the bearing. However, in such a surface hardening processing method, it is difficult to evenly process a surface of a bearing. If the bearing rolls, the bearing is peeled.

Shot peening, laser shot peening, deep rolling, ultrasonic shot peening, water jet peening, etc. are used to apply compressive residual stress to a surface of a bearing in order to remove a directivity of mechanical processing of the bearing and improve a fatigue life of the bearing.

The foregoing discussion is to provide general background information, and does not constitute an admission of prior art.

SUMMARY

One aspect of the invention provides a method of making a bearing. The method comprises: providing a bearing intermediate, which is unfinished while having an overall shape of a finished bearing product; and repeatedly impacting a surface of the bearing intermediate at one or more ultrasonic frequencies to modify characteristics of the bearing intermediate, wherein the resulting bearing intermediate or finished bearing product comprises a substantial amount of nano-size grains at or underneath the surface, wherein the resulting bearing intermediate or finished bearing product has the following properties: a roughness value smaller than about Ra 0.19 µm, a hardness value greater than about HRc 60 at the surface, and a compressive residual stress value between about −300 and about −2500 MPa at the surface.

In the foregoing method, the nano-size grains may be substantially distributed from the surface to the depth of about 100 µm. The roughness value may be from about 0.04 µm to about 0.12 µm. The hardness value may be from about HRc 63 to about HRc 67. The compressive residual stress value may be from about −700 MPa to about −1000 MPa. The compressive residual stress value between about −400 MPa and about −700 MPa may be found in the depth up to about 200 µm.

Still in the foregoing method, the method does not comprise grinding the surface before or after repeatedly impacting. The method does not comprise, before or after repeatedly impacting, one or more selected from the group consisting of shot peening, burnishing, light plasticity burnishing, ball burnishing, roller burnishing, laser shock peening, water-jet peening, ultrasonic peening, and deep rolling. The method does not comprise, before or after repeatedly impacting, one or more selected from the group consisting of thermal treatment, nitriding, carbon nitriding, and physical vapor deposition of a material onto the surface. The bearing intermediate is not subject to an additional treatment that causes a significant change in one of the foregoing characteristics.

Still in the foregoing method, providing the bearing intermediate may comprise turning a bearing blank to make the overall shape of the finished bearing product, wherein the bearing intermediate is not subject to an additional treatment that causes a significant change in one of the foregoing characteristics between turning and repeatedly impacting. Providing the bearing intermediate may comprise turning a bearing blank and thereafter grinding to make the overall shape of the finished bearing product, wherein the bearing intermediate is not subject to an additional treatment that causes a significant change in one of the foregoing characteristics between grinding and repeatedly impacting. The bearing intermediate prior to the repeated impacting may be substantially free of nano-size grains. Prior to repeatedly impacting the surface and a portion underneath the surface may have the following properties: a roughness value greater than about Ra 0.2 µm, a hardness value smaller than HRc 60, and a compressive residual stress value between about +500 and about −300 MPa at the surface.

Further in the foregoing method, the bearing intermediate prior to repeatedly impacting may comprise a substantial amount of micro-hair cracks at or underneath the surface. The resulting bearing intermediate or finished bearing product may be substantially free of micro-hair cracks at or underneath the surface. Repeatedly impacting may comprise: providing a machine comprising an impacting tip and a bearing holder; holding the bearing intermediate with the bearing holder; and contacting the impacting tip with the surface. The surface may be applied a static load from about 1 N to about 500 N. Repeatedly impacting may further comprise: vibrating the impacting tip at a dynamic load from about 2 N to about 1000 N, while contacting with the surface. The impacting tip may be repeatedly impacted with a force applied in a direction having an angle with reference to the surface from about 30° to 90°. Repeated impacting may further comprise: moving the impacting tip relative to the surface while vibrating. The impacting tip may move relative to the surface in a direction tangential to the surface. The impacting tip may move at a linear speed of from about 0.1 to about 100 m/min. The resulting bearing intermediate or finished bearing product may comprise a pattern of dimples formed on the surface, wherein the pattern has a substantially constant pitch between two immediately neighboring the dimples.

In the foregoing method, the finished bearing product may be a piece of a bearing selected from a group consisting of a journal bearing, a rolling bearing, a ball bearing, a roller bearing, a needle bearing, a radial bearing, a thrust bearing and a linear bearing. Repeatedly impacting the surface does not change the overall shape while changing a contour of the surface One aspect of the present invention provides a bearing processing system using an ultrasonic nano crystal surface modifier and a processing method using the same by which a hammering speed, a hammering progress speed, a hammering angle, etc. of the ultrasonic nano crystal surface modifier are precisely controlled to control sizes and directions of micro-dimples and a contact count of dimples per unit area so as to reduce a friction coefficient and a wear rate of a bearing during sliding or rolling and improve a fatigue life occurring when the bearing is bent, twisted, sealed, or compressed.

A bearing processing system using an ultrasonic nano crystal surface modifier according to an aspect of the present invention may precisely control a hammering speed, a hammering progress speed, a hammering angle, etc. of the ultrasonic nano crystal surface modifier. Thus, the bearing processing system may freely control sizes and directions of micro-dimples, a contact count of micro-dimples per unit area, etc. so as to reduce a friction coefficient and a wear rate of a bearing during sliding or rolling of the bearing. Also, the bearing processing system may apply compressive residual stress to a surface of the bearing and improve surface hardness of the bearing to improve rolling contact fatigue strength. In addition, the bearing processing system may improve a fatigue life occurring when the bearing is bent, twisted, sealed, or compressed.

One aspect of the invention provides a bearing processing system using an ultrasonic nano crystal surface modifier, comprising: the ultrasonic nano crystal surface modifier contacting a surface of a structure to hammer the surface of the structure using ultrasonic vibrations; a body comprising at least one or more transferring systems and at least one or more driving systems, wherein the at least one or more transferring systems control a linear motion of the ultrasonic nano crystal surface modifier, and the at least one or more driving systems control a processing angle of the ultrasonic nano crystal surface modifier; and at least one or more structure rotating shafts comprising a unit fixing and rotating the structure.

In the foregoing system, the driving systems comprise a rotating shaft which controls the processing angle of the ultrasonic nano crystal surface modifier and a driving motor which controls an angle of the rotating shaft. The structure rotating shafts are one of a chuck and a magnet, wherein one of the chuck and the magnet comprises jigs which fix components of the bearing to inhibit the bearing from being vibrated when the bearing is processed. The structure rotating shafts are one of a chuck or a magnet, wherein one of the chuck and the magnet comprises jigs which fix components of the bearing to inhibit the bearing from being vibrated when the bearing is processed.

Still in the foregoing system, if the bearing is processed using the ultrasonic nano crystal surface modifier, the driving systems are controlled so that a hammering tip of the ultrasonic nano crystal surface modifier coincides with a normal of a contact surface of the bearing. The jigs are private jigs which support an extrados and an intrados of a rolling bearing, a ball, or a roller. The jigs are private jigs which process a journal bearing.

Another aspect of the invention provides a bearing processing method using an ultrasonic nano crystal surface modifier, comprising: generating a movement path of the ultrasonic nano crystal surface modifier according to a shape of a bearing; determining processing parameters to process the bearing having a mechanical characteristic required for use purpose of the bearing; writing a processing program according to the movement path and the processing parameters; setting the ultrasonic nano crystal surface modifier; and installing private jigs according to a size and a shape of the bearing.

In the foregoing method, the movement path is generated so that a hammering tip of the ultrasonic nano crystal surface modifier coincides with a normal of a contact surface of the bearing. One or more processing parameters for controlling hardness of the bearing are one or more of static load and dynamic load. Processing parameters for controlling surface roughness of the bearing and structures of micro-dimples are one or more of static load, dynamic load, a transferring speed, and a size and a shape of a curved surface of a protrusion of the hammering tip. A processing parameter for controlling compressive residual stress of the bearing is one or more of static load, dynamic load, and a transferring speed. A processing parameter for controlling a nano depth of the bearing is one or more of static load and dynamic load. Transformation ranges of the processing parameters are determined when static load is between 1 N and 500 N, dynamic load is between 2 N and 1000 N, a transferring speed is between 0.03 mm/rev and 0.15 mm/rev, and a processing speed is between 6 m/min and 32 m/min, and the hammering tip has a curved surface with a diameter between 0.1 mm and 6 mm and has one of a spherical shape and a polygonal shape.

BRIEF DESCRIPTION OF THE DRAWINGS

FIG. 6A illustrates processing of inner curved surfaces of a bearing using a bearing processing system using an ultrasonic nano crystal surface modifier, according to an embodiment of the present invention.

FIG. 6B illustrates processing of outer curved surfaces of a bearing using a bearing processing system using an ultrasonic nano crystal surface modifier, according to another embodiment of the present invention.

FIG. 6C illustrates a hammering position of an ultrasonic nano crystal modifier according to an embodiment of the present invention.

FIGS. 15A and 15B are schematic views of friction torque test rig.

FIG. 16 shows comparison of surface roughness and hardness.

FIG. 22 shows a journal bearing test bench.

FIGS. 23A and 23B show Journal bearing surface 2D/3D topology before and after UNSM fereing.

FIGS. 39C and 15D show SEM micrographs of SAE52100 after UNSM.

FIG. 40A shows a SEM micrograph of cross-section of SAE52100 (flaking failure) before UNSM, and FIG. 40B shows a SEM micrograph of cross-section of SAE52100 (flaking failure) after UNSM.

FIG. 41 shows friction torque of SAE52100 before and after UNSM (500 rpm, 800 kgf).

DETAILED DESCRIPTION OF EMBODIMENTS

Embodiments will now be described more fully with reference to the accompanying drawings, in which embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
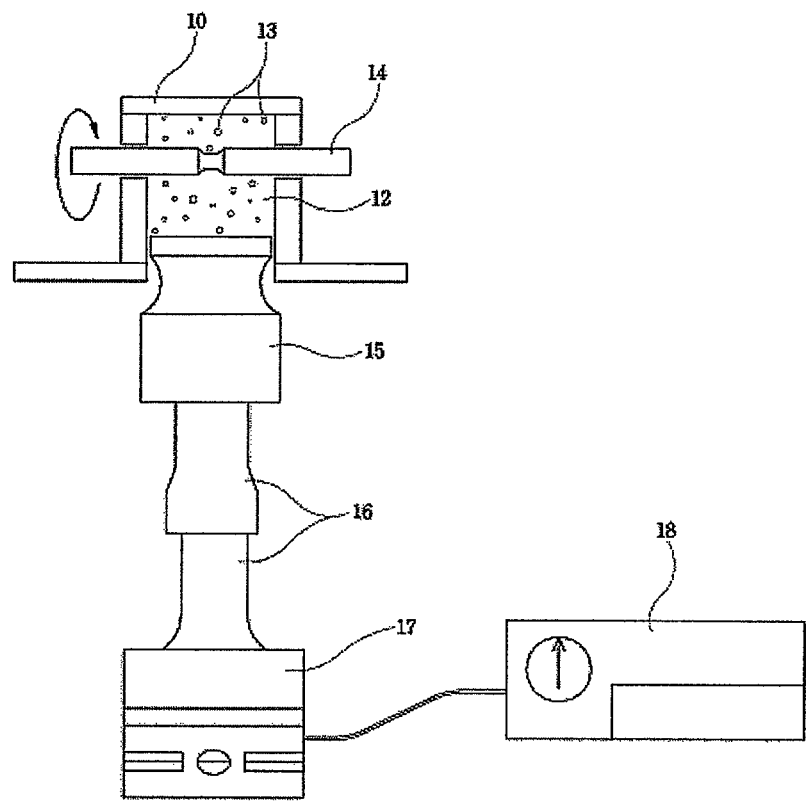
FIG. 1 illustrates a surface modifying method using ultrasonic waves.
Figure 2:
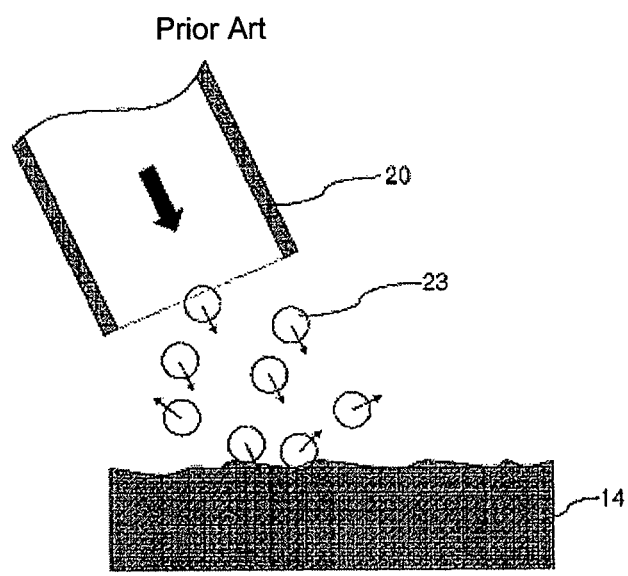
FIG. 2 illustrates a surface modifying method using shot peening.

FIG. 1 illustrates a surface modifying method using ultrasonic waves, and FIG. 2 illustrates a surface modifying method using shot peening. In theses surface modifying methods of FIG. 1 or 2, a plurality of abrasive particles 13 or shot balls 23 clash onto a material 14 to be processed. Next, relatively protruding portions of the material 14 are locally plastically deformed so as to obtain smooth surface roughness of the material 14.

These surface modifying methods will now be described in more detailed. In the surface modifying method using the ultrasonic waves, a generator 18 is supplied with power, transduces the power into electric energy, and transmits the electric energy to a piezoceramic 17. The piezoceramic 17 transduces the electric energy into mechanical energy. A booster 16 amplifies the mechanical energy, and the amplified mechanical energy ultrasonically vibrates a tool 15, which is connected to an end of the booster 16, so that a lapping agent 12 contained in a vessel 10 flows. Thus, the plurality of abrasive particles 14 disorderly move due to the flow of the lapping agent 12 and thus randomly hammer a surface of the material 14 which is dipped into the vessel 10.

In the processing method using the shot peening, numerous shot balls 23 momentarily clash onto the surface of the material 14 due to air pressure, a centrifugal force, or the like, so as to apply compressive residual stress to the surface of the material 14. Also, surface processing is performed to form plastic processing dimples, and an outlet 20, from which the shot balls 23 are ejected, is moved above the process 14 to obtain a continuous processing area.

In the above-described surface modifying methods, a plurality of shot balls 23 momentarily randomly clash onto a material to be processed, within a predetermined processing area in order to hammer the material. Thus, the material is cracked or broken down to be chipped by movements of processing particles. In other words, the material receives kinetic energy of the processing particles, and thus a surface of the material is plastically deformed, i.e., dimples, are formed in the surface of the material.

However, since numerous particles having kinetic energy irregularly clash onto the surface of the material, the material is processed so as to have average surface roughness. In most cases, the surface roughness of the material becomes worse than before the material is processed, and oil pockets or micro dimples containing lubricant are formed in the surface of the material. However, sizes, density, and patterns of the oil pockets or the micro-dimples are not controlled.

Accordingly, the above surface modifying methods are difficult to be used when a specific part of a material, which is to be processed, is divided to process dimples so as to limitedly have specific numerical surface roughness. Also, even if a shape of the material is very irregular or dimples are formed in an inner diameter of the material, the above surface modifying method is difficult to be used. Also, a surface processing method using deep rolling is advantageous to apply large compressive residual stress to a structure which is to be processed. However, it is impossible to form dimple structures, and surface hardness and a shape of the structure are limited.

In addition, since hammering dimples are randomly formed in the surface of a material which is to be processed, it is difficult to generate compressive residual stress in a specific part which requires high strength. If shot balls slightly hammer the material, magnitude or depth of compressive stress becomes low. Thus, the material does not have enough strength to be used as a material for a bearing. If the shot balls strongly hammer the material, the magnitude or depth of the compressive stress becomes high. However, the surface of the material is thermally deformed or excessively plastically deformed to be chipped. Thus, since the surface of the material becomes rough, additional processing is required.

Therefore, a surface modifier and a modifying method are required to increase surface hardness and compressive residual stress of a bearing, reduce a friction coefficient occurring during sliding or rolling, and smoothly lubricate the material in order to obtain a high-quality bearing. For this purpose, there is required a system and a method for strongly hammering a surface of a material, which is to be processed, and controlling sizes, densities, and patterns of dimples, which are to be formed, without worsening thermal deformation or surface roughness of a surface of the material.

A bearing processing system using an ultrasonic nano crystal surface modifier according to an embodiment of the present invention includes the ultrasonic nano crystal surface modifier, at least one or more transferring systems, at least one or more driving systems, and at least one or more structure rotating shafts. The ultrasonic nano crystal surface modifier repeatedly impacts or hammers the structure using ultrasonic vibrations. The at least one or more transferring systems control linear motions of the ultrasonic nano crystal surface modifier. The at least one or more driving systems control a processing angle of the ultrasonic nano crystal surface modifier. The at least one or more structure rotating shafts fix and rotate a structure.

The bearing processing system may be realized in various shapes according to a shape, size, or an installation place of the structure, etc. There will now be described in detail a bearing processing system includes which two transferring system, a driving system, and a structure rotating shaft and in which a horizontal plane of the structure rotating shaft and the center of an impacting or hammering tip of an ultrasonic nano crystal surface modifier are in similar positions to process an intrados and an extrados of a bearing.

Figure 3:
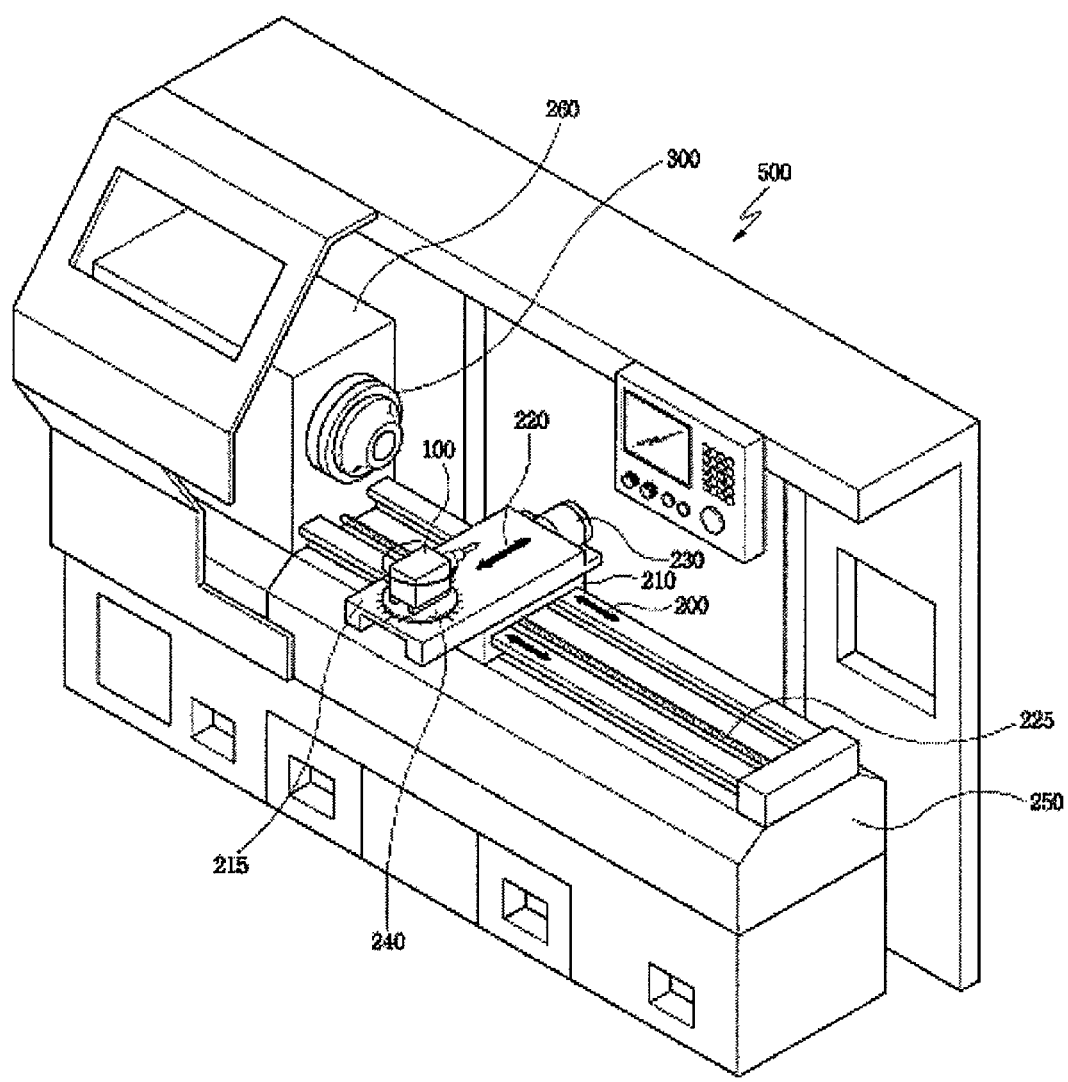
FIG. 3 illustrates a bearing processing system using an ultrasonic nano crystal surface modifier according to an embodiment of the present invention.

FIG. 3 illustrates a bearing processing system using an ultrasonic nano crystal surface modifier according to an embodiment of the present invention. Referring to FIG. 3, a bearing processing system 500 of the present embodiment includes an ultrasonic nano crystal surface modifier 100, a body 250, and a structure rotating shaft 260. The ultrasonic nano crystal surface modifier 100 contacts a surface of the structure to hammer the structure through ultrasonic vibrations. The body 250 includes an X-axis transferring system 200, a Y-axis transferring system 220, and a C-axis driving system 240. The X-axis transferring system 200 is installed under the ultrasonic nano crystal surface modifier 100 and performs left and right motions in a horizontal direction with respect to the structure rotating shaft 260. The Y-axis transferring system 220 is orthogonal to the X-axis transferring system 200 and assists the ultrasonic nano crystal surface modifier 100 to perform back and forth motions in a horizontal direction with respect to the structure rotating shaft 260. The C-axis driving system 240 is combined with the ultrasonic nano crystal surface modifier 100 and stops or continues rotating the ultrasonic nano crystal surface modifier 100 to control a processing angle. The structure rotating shaft 260 includes a chuck 300 which fixes and rotates the structure, i.e., a bearing.

X-axis and Y-axis tables 210 and 215 are respectively placed on guide surfaces of the X-axis and Y-axis transferring systems 200 and 220 of the body 250 of the bearing processing system 500. Speeds and positions of the X-axis and Y-axis tables 210 and 215 are precisely controlled by a feed screw 225 and a servomotor 230 so that the X-axis and Y-axis tables 210 and 215 perform back and forth linear motions on the guide surfaces.

The C-axis driving system 240 is a tool post with which the ultrasonic nano crystal surface modifier 100 is combined through a screwing instrument (not shown) such as a bolt or the like. A driving motor (not shown) stops or continues rotating the C-axis driving system 240 to the left and right.

The bearing processing system 500 is controlled using general computer numerical control (CNC). When the X-axis 200 and Y-axis transferring systems 220 transfer the ultrasonic nano crystal surface modifier 100 in left and right directions and front and back directions, the C-axis driving system 240 shortly or continuously controls the hammering angle of the ultrasonic nano crystal surface modifier 100 to precisely process the bearing. In particular, the C-axis driving system 240 precisely processes curved parts of the bearing. Position controlling apparatus and method using a servomotor are well known and thus will not be described herein.

Figure 4:
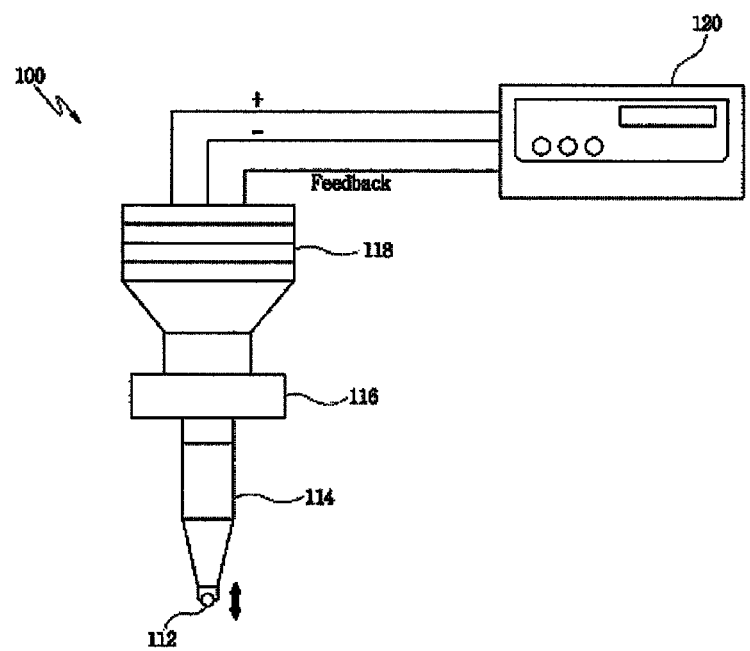
FIG. 4 illustrates the ultrasonic nano crystal surface modifier of FIG. 3.

FIG. 4 illustrates the ultrasonic nano crystal surface modifier 100 according to an embodiment of the present invention. Referring to FIG. 4, the ultrasonic nano crystal surface modifier 100 includes an impacting or hammering tip 112, a horn 114, a booster 116, a transducer 118, and a generator 120. The hammering tip 112 hammers a surface of the bearing and is fixed to the horn 114, and the horn 114 amplifies and transmits ultrasonic vibrations. The booster 116 amplifies the ultrasonic vibrations, and the transducer 118 transduces electric energy into mechanical energy. The generator 120 supplies high frequency electric energy to the ultrasonic nano crystal surface modifier 100.

The generator 120 modulates power into high frequency electric energy and supplies the high frequency electric energy to the transducer 118.

The transducer 118 is an element whose volume is changed by an electrical signal. Thus, the transducer 118 is supplied with the high frequency electric energy from the generator 120 to repeatedly expand and shrink so as to transducer the high frequency electric energy into mechanical energy.

The booster 116 amplifies vibrations generated from the transducer 118 and transmits the vibrations to the hammering tip 112 through the horn 114 which is connected to the booster 116.

The horn 114 re-amplifies the vibrations, which has been amplified by the booster 116, and then transmits the vibrations to the hammering tip 112 or simply transmits the vibrations to the hammering tip 112. An amplifying rate of the vibrations depends on a shape of the horn 114.

The hammering tip 112 directly contacts a surface of a material, which is to be processed, to hammer the material so as to strongly plastically process the material and form micro-dimples. A metal ball or a protrusion having one of various shapes is exposed as the hammering tip 112 to be fixed to the horn 114.

The protrusion of the hammering tip 112 is formed of a cemented carbide material or a ceramic material.

The protrusion of the hammering tip 112 may have one of various shapes including a spherical shape (including an elliptical shape), a triangular shape, a rectangular shape, a hexagonal shape, an octagonal shape, etc. Thus, shapes of dimples formed in a surface of a material to be processed depend on the shape of the protrusion of the hammering tip 112.

The hammering tip 112 contacts the surface of the bearing by a predetermined pressure in order to hammer the surface of the bearing by a predetermined force using the ultrasonic nano crystal surface modifier 100. For this purpose, a pressing unit (not shown) is installed at the back of a body of the ultrasonic nano crystal surface modifier 100.

The pressing unit may use various pressing methods, including a pressing method using an elastic force of a spring or the like, a pressing method using a hydraulic pressure, a pneumatic pressure, etc.

Figure 5:
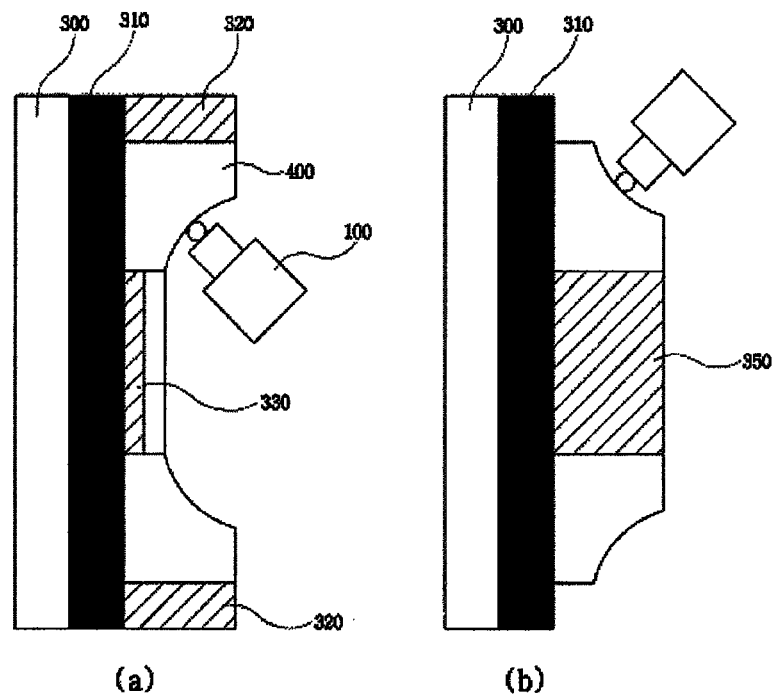
FIG. 5A illustrates a bearing which is installed in a chuck of a bearing processing system using an ultrasonic nano crystal surface modifier according to an embodiment of the present invention.
FIG. 5B illustrates a bearing which is installed in a chuck of a bearing processing system using an ultrasonic nano crystal surface modifier according to another embodiment of the present invention.

FIG. 5A illustrates a bearing which is installed in a chuck of a bearing processing system using an ultrasonic nano crystal surface modifier according to an embodiment of the present invention. FIG. 5B illustrates a bearing which is installed in a chuck of a bearing processing system using an ultrasonic nano crystal surface modifier according to another embodiment of the present invention.

Referring to FIGS. 5A and 5B, the chuck 300 of the bearing processing system 500 includes a magnet 310 through which the bearing 400 adheres to the chuck 300 and which includes one or more jigs 320 and 330 or 350. The jigs 320 and 330 or 350 respectively correspond to an interior and an exterior of the bearing 400.

The bearing 400, which is a material to be processed, is required to be maximally inhibited from being vibrated in order to be highly precisely processed. However, if a general chuck is used, a bearing may be tightly fixed. Since high load is imposed on a specific external part of the bearing 400, the specific external part of the bearing 400 is damaged or plastically deformed. When the bearing 400 is processed using the bearing processing system 500, the bearing 400 is tightly adhered to the chuck 300 using the jigs 320 and 330 or 350 to be inhibited from being vibrated. Shapes of the jigs 320 and 330 or 350 may be variously selected depending on a kind, a size, a shape, etc. of a bearing. For example, private jigs for effectively processing an extrados and an intrados of a rolling bearing, or a surface of a ball or a roller may be used. Also, if the private jigs are used, various types of bearings including a journal bearing, etc. may be processed.

A chuck may be one of various fixing units, including an electromagnet, a hydraulic fixing unit, a pneumatic fixing unit, a manual fixing unit, etc.

FIG. 6A illustrates processing of inner curved surfaces of a bearing using a bearing processing system using an ultrasonic nano crystal surface modifier, according to an embodiment of the present invention. FIG. 6B illustrates processing of outer curved surfaces of a bearing using a bearing processing system using an ultrasonic nano crystal surface modifier, according to another embodiment of the present invention. FIG. 6C illustrates a hammering position of an ultrasonic nano crystal modifier according to an embodiment of the present invention. Referring to FIGS. 6A and 6B, the bearing processing system 500 controls the X-axis 200 and Y-axis transferring systems 220 to process a plane of the bearing 400. The bearing processing system 500 also controls a rotation of the C-axis driving system 240, i.e., the tool post on which the ultrasonic nano crystal surface modifier 100 is installed, to process curved parts 410 of the bearing 400.

If the curved parts 410 of the bearing 400 are processed using the bearing processing system 500, the C-axis driving system 240 is controlled so that the hammering tip 112 of the ultrasonic nano crystal surface modifier 100 coincides with normals of the curved parts 410 of the bearing 400.

Referring to FIG. 6C, the hammering tip 112 of the ultrasonic nano crystal surface modifier 100 is installed to be aligned with a center of a centrifugal axis or a radial axis of the bearing 400. If the hammering tip 112 of the ultrasonic nano crystal surface modifier 100 is not aligned with the center of the centrifugal axis or the radial axis of the bearing 400 and thus does not perpendicularly meet with a processed surface of the bearing 400, micro-dimples may not be uniformly maintained in the surface of the bearing 400. Also, the surface of the bearing 400 may be unnecessarily plastically deformed.

If the hammering tip 112 is aligned with the center of the centrifugal axis or the radial axis of the bearing 400 and thus perpendicularly hammers the curved parts 410, shapes, sizes, and directivities of the micro-dimples may be uniformly maintained, and the surface of the bearing 400 may be prevented from being unnecessarily plastically deformed or chipped. Thus, hardness and surface roughness of the bearing 400 are more improved than when the ultrasonic nano crystal surface modifier 100 is fixed to slantly hammer the bearing 400 or hammer the bearing 400 in a lower or higher position than the center of the centrifugal axis of the bearing 400.

Figure 7:
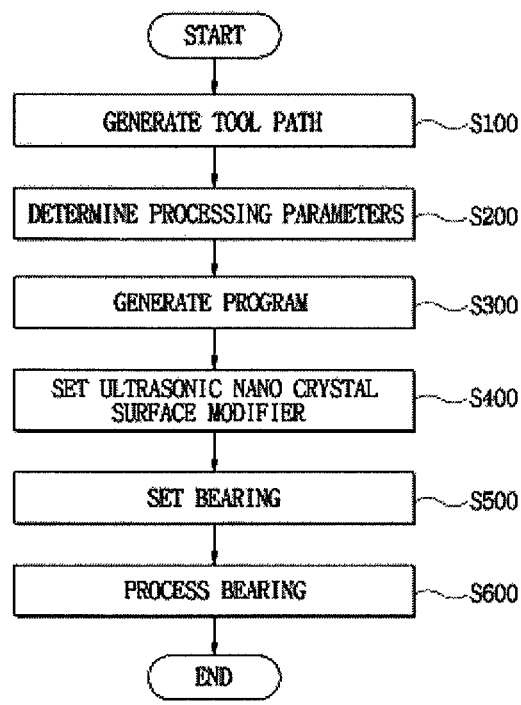
FIG. 7 is a flowchart of a working process of a bearing processing system using an ultrasonic nano crystal surface modifier according to an embodiment of the present invention.

FIG. 7 is a flowchart of a working process of the bearing processing system 500, according to an embodiment of the present invention. Referring to FIG. 7, in operation S100, a tool path is generated to process the bearing 400 using the bearing processing system 500. The tool path refers to a moving path of the ultrasonic nano crystal surface modifier 100 which is formed by simultaneously or separately controlling X, Y, and C axes according the shape of the bearing 400.

If the tool path is generated, a path of the C-axis driving system 240 is set so that the hammering tip 112 of the ultrasonic nano crystal surface modifier 100 coincides with a normal of a contact surface of the bearing 400.

In operation S200, processing parameters necessary for processing the bearing 400 are determined. The processing parameters are determined to obtain micro-dimples having appropriate strength, sizes, and shapes according to characteristics of the bearing 400. In other words, a pressure applied to the ultrasonic nano crystal surface modifier 100 by a pressing unit, frequency and amplitude supplied to the hammering tip 112, a size and a shape of the hammering tip 112 of the ultrasonic nano crystal surface modifier 100, a processing speed, and a transferring speed of the hammering tip 112 when processing the bearing 400, etc. are determined as the processing parameters.

Total contact load applied to the bearing 400 when processing the bearing 400 using the ultrasonic nano crystal surface modifier 100 is determined by static load applied by the pressing unit and dynamic load of the hammering tip 112 hammering the surface of the bearing 400. A contact count of micro-dimples per unit area is determined by a rotation speed of the bearing 400, frequency (kHz) supplied to the hammering tip 112, and a transferring speed (mm/rev) and a processing speed (m/min) of the hammering tip 112. Here, the transferring speed refers to a transferring distance of the ultrasonic nano crystal surface modifier 100 during a one-time rotation of a structure to be processed, and the processing speed refers to a linear speed at a hammering point. Effects of processing conditions on the surface of the bearing 400 will be described later.

In operation S300, a program necessary for processing the bearing 400 is generated using the tool path and the processing parameters.

In operation S400, the ultrasonic nano crystal surface modifier 100 is set according to the processing conditions. In other words, in operation S400, the static load of the ultrasonic nano crystal surface modifier 100, a material for the hammering tip 112, and a shape, a size, and frequency of the hammering tip 112 are set according to sizes, shapes, and depths of micro-dimples.

In operation S500, private jigs are installed according to the size and shape of the bearing 400 to be processed to set a structure. In operation S600, the bearing 400 is processed.

Characteristics of the bearing 400, which has been processed using the ultrasonic nano crystal surface modifier 100, depend on conditions of the processing parameters. Thus, breakdown causes frequently occurring in use environments of the bearing 400, etc. are checked. Table 1 below shows breakage contents and causes of the bearing 400 and a solution to prevent the breakage of the bearing 400.

TABLE 1

| Failure Mode | Breakage Cause | Solution |
| --- | --- | --- |
| Pitting, Spalling | High Load, Vibration Load | Apply compressive residual stress Improve hardness |
| Wear, Flaking, Fretting | Inappropriate lubricant, Vibration Load | Improve hardness, Reduce friction coefficient (Improve surface roughness and Micro Dimple) |
| Indentation/ Brinnelling | High Load, Vibration Load, Shock Load | Apply compressive residual stress, Improve hardness |

As shown in Table 1 above, pitting and spalling mainly occur due to high load or vibration load. In order to prevent pitting and spalling, compressive residual stress is applied to a bearing, and surface hardness of the bearing is improved. Wear, flaking, or fretting mainly occurs due to inappropriate lubricant or vibration load. In order to prevent wear, flaking, or fretting, hardness of the bearing is improved, and a friction coefficient of the bearing is reduced. Indentation or brinnelling mainly occurs due to high load, vibration load, or shock load. In order to prevent indentation or brinnelling, the hardness of the bearing is improved, and the compressive residual stress is applied to the bearing.

Figure 8:
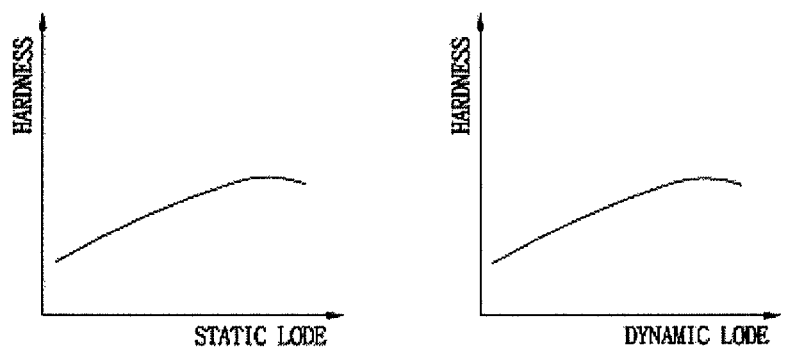
FIG. 8 is a graph illustrating effects of static load and dynamic load on hardness of a bearing when the bearing is processed using an ultrasonic nano crystal surface modifier.
Figure 9:
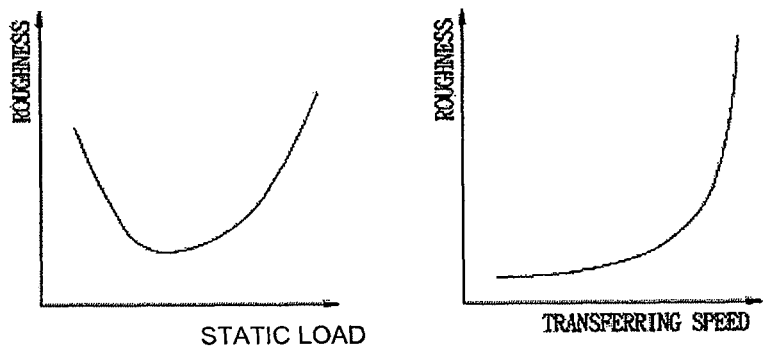
FIG. 9 is a graph illustrating effect of the static load and a transferring speed on surface roughness of the bearing when the bearing is processed using the ultrasonic nano crystal surface modifier.
Figure 10:
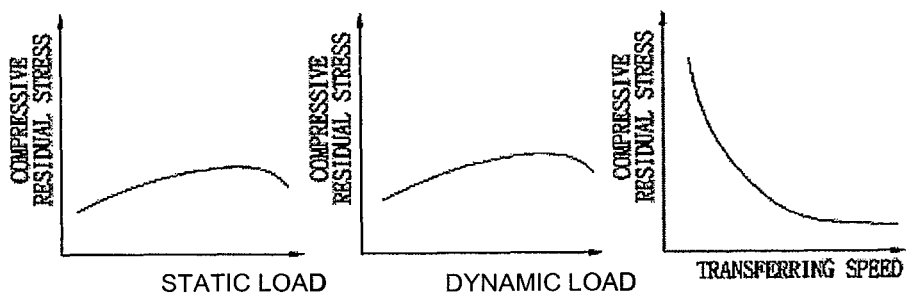
FIG. 10 is a graph illustrating effects of the static load, hammering strength, and the transferring speed on compressive residual stress when the bearing is processed using the ultrasonic nano crystal surface modifier.
Figure 11:
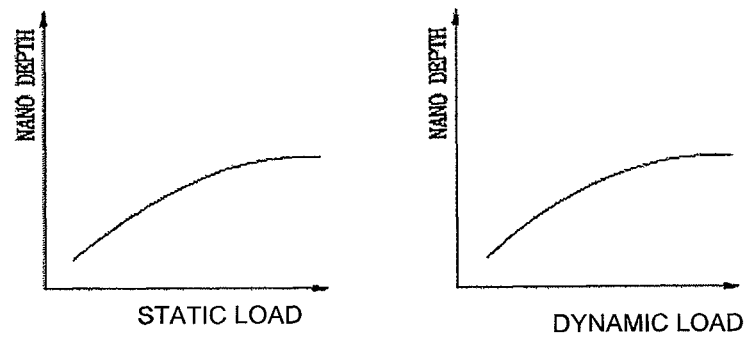
FIG. 11 is a graph illustrating effects of the static load and the hammering strength on nano depth when the bearing is processed using the ultrasonic nano crystal surface modifier.
Figure 12:
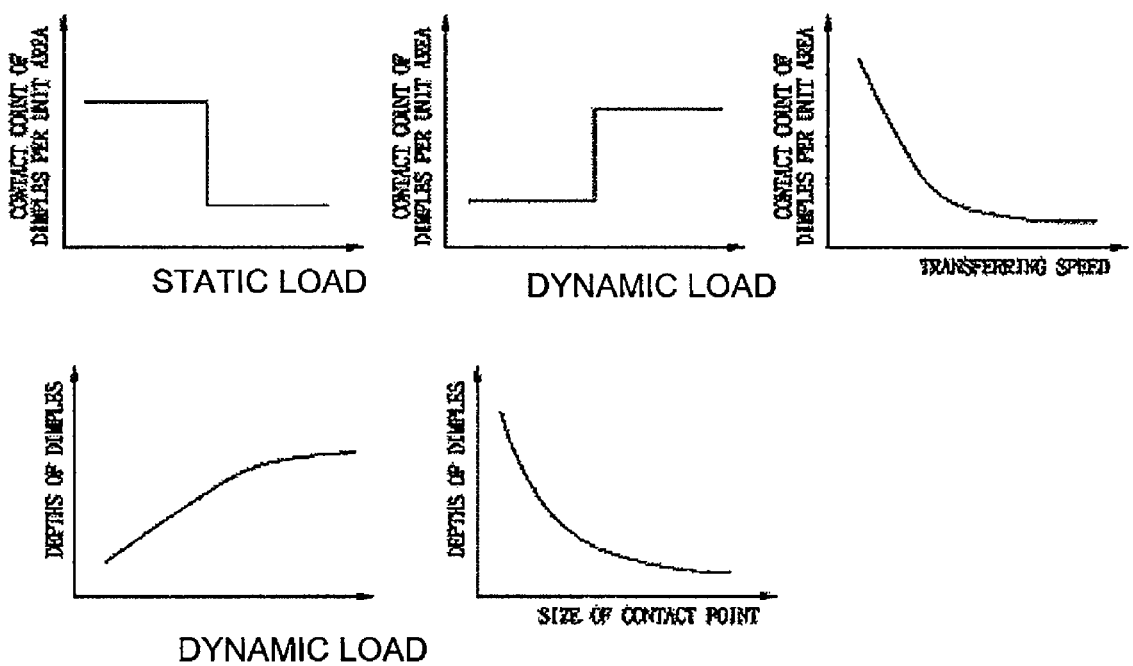
FIG. 12 is a graph illustrating effects of the static load, the hammering speed, and the transferring speed on a contact count of dimples per unit area and depths of the dimples when the bearing is processed using the ultrasonic nano crystal surface modifier.

FIG. 8 is a graph illustrating effects of static load and dynamic load on hardness of a bearing when the bearing is processed using an ultrasonic nano crystal surface modifier. FIG. 9 is a graph illustrating effect of the static load and a transferring speed on surface roughness of the bearing when the bearing is processed using the ultrasonic nano crystal surface modifier. FIG. 10 is a graph illustrating effects of the static load, hammering strength, and the transferring speed on compressive residual stress when the bearing is processed using the ultrasonic nano crystal surface modifier. FIG. 11 is a graph illustrating effects of the static load and the hammering strength on nano depth when the bearing is processed using the ultrasonic nano crystal surface modifier. FIG. 12 is a graph illustrating effects of the static load, the hammering speed, and the transferring speed on a contact count of dimples per unit area and depths of the dimples when the bearing is processed using the ultrasonic nano crystal surface modifier.

Referring to FIG. 8, if static load and dynamic load are increased during processing of the bearing 400, nano depth is deepened, and hardness of the bearing 400 is increased. However, the increase in the hardness of the bearing 400 by the static load and the dynamic load is limited. Also, if the static load is excessively increased, surface roughness of the bearing 400 is worsened. Thus, static load and dynamic load appropriate for the bearing 400 are required to be set in consideration of a material for the bearing 400, the shape of the hammering tip 112, etc.

If static load and dynamic load of the ultrasonic nano crystal surface modifier 100 are increased to increase the surface hardness of the bearing 400, a surface wearing of the bearing 400 may be reduced. Also, the surface of the bearing 400 may be prevented from being stripped or plastically deformed when the bearing 400 rotates at a high speed or receives high load.

Referring to FIG. 9, the surface roughness of the bearing 400 is inversely proportional to the static load and proportional to a transferring speed. However, if the static load is higher than or equal to predetermined load, the surface of the bearing 400 is plastically deformed by the static load. Thus, the surface roughness of the bearing 400 is worsened. In this case, the surface roughness of the bearing 400, which is plastically deformed by the static load, varies with the material and a hammered shape of the bearing 400. The static load is required to be appropriately set through an experiment. Since a hammering count per unit area is increased with a slow transferring speed, the surface roughness of the bearing 400 is improved by the transferring speed.

If the surface roughness of the bearing 400 is improved, the friction coefficient of the bearing 400 is decreased. Thus, the surface of the bearing 400 is prevented from being worn.

Referring to FIG. 10, the compressive residual stress applied to the surface of the bearing 400 is proportional to the static load and the dynamic load and inversely proportional to the transferring speed. Referring to FIG. 11, the nano depth of the surface of the bearing 400 is proportional to the static load and the dynamic load.

If the compressive residual stress and the nano depth of the bearing 400 are increased, contact fatigue strength of the bearing 400 is improved during sliding or rolling of the bearing 400. Also, a fatigue life of the bearing 400 occurring during bending, twisting, sealing, and/or compressing of the bearing 400 is improved.

Referring to FIG. 12, a contact count of dimples per unit area of the surface of the bearing 400 is not generally affected by variations of the static load and the dynamic load. However, if the static load exceeds a predetermined value, it is difficult to form normal dimples due to the plastic deformation of the surface of the bearing 400 by load of the hammering tip 112. If the dynamic load is less than the predetermined value, it is difficult to form normal dimples in a surface of a material to be processed. The contact count of dimples per unit area is decreased with an increase in the processing speed.

Depths of dimples are increased with an increase in the dynamic load but decreased with an increase in a contact area.

Transformation ranges of the processing parameters are determined when the static load is between 1 N and 500 N, the dynamic load is between 2 N and 1000 N, the processing speed is between 0.1 m/min and 100 m/min, and the transferring speed is between 0.01 mm/rev and 1 mm/rev. The hammering tip 112 may have a curved surface with a diameter between 0.1 mm and 6 mm and may have a spherical shape, a triangular shape, a rectangular shape, a polygonal shape, or the like.

In one embodiment, the repeatedly impacting a surface of a bearing intermediate, the surface is applied a static load from about 1 N to about 500 N. In certain embodiments, the static load is about 1 N, about 5 N, about 10 N, about 20 N, about 30 N, about 50 N, about 100 N, about 150 N, about 200 N, about 250 N, about 300 N, about 400 N, or about 500 N. In some embodiments, the static load can be a range defined by two of the above values.

In one embodiment, the dynamic load of vibrating of the impacting tip is from about 2 N to about 1000 N, while contacting with the surface. In a certain embodiments, the dynamic load is about 2 N, about 10 N, about 20 N, about 50 N, about 60 N, about 70 N, about 100 N, about 200 N, about 300 N, about 500 N, about 550 N, about 580 N, about 600 N, about 650 N, about 700 N, about 900 N, or about 1000 N. In some embodiments, the static load can be a range defined by two of the above values.

In one embodiment, the repeatedly impacting include vibrating the impacting tip in a direction forming an angle with the surface between about 30° to 90°. In certain embodiments, the angle is about 30°, about 45°, about 50°, about 60°, about 70°, about 75°, about 80°, about 83°, about 85°, about 87°, about 88°, about 89°, or about 90°. In some embodiments, the angle can be a range defined by two of the above values.

In one embodiment, the impacting tip moves or is transferred at a speed of from about 0.1 to about 100 m/min. In certain embodiments, the speed is about 0.1 m/min, about 1 m/min, about 5 m/min, about 6 m/min, about 8 m/min, about 10 m/min, about 12 m/min, about 15 m/min, about 18 m/min, about 20 m/min, about 25 m/min, about 27 m/min, about 30 m/min, about 32 m/min, about 33 m/min, about 35 m/min, about 40 m/min, about 50 m/min, about 70 m/min, or about 100 m/min. In some embodiments, the angle can be a range defined by two of the above values.

After repeatedly impacting a surface of the bearing intermediate, the resulting bearing intermediate or finished bearing product include a substantial amount of nano-size grains at or underneath the surface. In some embodiments, the nano-size grains are substantially distributed from the surface to a certain depth. In certain embodiments, the certain depth is about 50 μm, about 100 μm, about 150 μm, about 250 μm, about 350 μm, or about 500 μm. In several embodiments, the certain depth can be a range defined by two of the foregoing depths.

In certain embodiments, the resulting bearing intermediate or finished bearing product has the roughness value between about Ra 0.04 μm and about Ra 0.19 μm. In one embodiment, the roughness value is smaller than about Ra 0.12 μm. In some embodiments, the roughness value is about Ra 0.04 μm, about Ra 0.08 μm, about Ra 0.10 μm, about Ra 0.11 μm about Ra 0.12 μm, about Ra 0.14 μm, about Ra 0.16 μm, about Ra 0.18 μm, about Ra 0.19 μm, or about Ra 0.20 μm. In several embodiments, the roughness value can be a range defined by two of the foregoing values.

In certain embodiments, the resulting bearing intermediate or finished bearing product has a hardness value between about HRc 60 and about HRc 67. In one embodiment, the hardness value is greater than about HRc 67. In some embodiments, the hardness value is about HRc 60, about HRc 62, about HRc 63, about HRc 65, or about HRc 67. In several embodiments, the hardness value can be a range defined by two of the foregoing values.

In certain embodiments, the resulting bearing intermediate or finished bearing product has a compressive residual stress value between about −300 MPa and about −2500 MPa at the surface. In some embodiments, the compressive residual stress value is about −300 MPa, about −500 MPa, about −600 MPa, about −700 MPa, about −800 MPa, about −900 MPa, about −1000 MPa, about −1300 MPa, about −1500 MPa, about −2000 MPa, or about −2500 MPa. In several embodiments, the compressive residual stress value can be a range defined by two of the foregoing values.

In some embodiment, the resulting bearing intermediate or finished bearing product includes a compressive residual stress from the surface to a certain depth. In certain embodiments, the certain depth is about 200 μm, about 300 μm, about 500 μm, about 700 μm, about 1000 μm, about 1300 μm, about 1500 μm, about 2000 μm, or about 2500 μm. In several embodiments, the certain depth can be a range defined by two of the foregoing depths.

As described above, a bearing processing system using an ultrasonic nano crystal surface modifier according to an embodiment of the present invention simultaneously or independently controls X, Y, and C axes to generate a movement path. Also, the bearing processing system controls static load and dynamic load applied to a bearing, a transferring speed of the bearing, etc. to process the bearing so that the bearing has desired strength and surface roughness.

Also, if the bearing is processed using the bearing processing system, sizes of micro dimples, a contact count of the micro-dimples per unit area, and shapes of the micro-dimples are precisely controlled without thermally deforming or chipping or unnecessarily plastically deforming a surface of the bearing. Thus, hardness and surface roughness of the bearing are improved. Moreover, desired compressive residual stress is applied to the bearing, and oil pockets are generated by the micro-dimples to reduce a wear rate of the bearing. Heat generation is reduced, and contact fatigue strength is improved to increase the lifespan of the bearing.

In a bearing processing system using an ultrasonic nano crystal surface modifier and a processing method using the bearing processing system according to embodiments of the present invention, a hammering speed, a hammering progress speed, and a hammering angle with respect to a surface of a bearing during processing of the bearing are precisely controlled to generate micro-dimples or oil pockets in the surface of the bearing. A tissue of the surface of the bearing is modified into nano crystals, and compressive residual stress is applied to the bearing to improve hardness of the bearing. Thus, a friction coefficient and a wear rate of the bearing occurring during sliding or rolling of the bearing are reduced, and rolling contact fatigue strength of the bearing is improved. A fatigue life of the bearing occurring during bending, twisting, sealing, or compressing of the bearing is improved.

The method of making a bearing in accordance with embodiments can include any features disclosed in some examples below.

EXAMPLE 1

The Evaluation of the Micro Tracks and Micro Dimples on Tribological Characteristics of Thrust Ball Bearings One of the primary remedies for tribological problems is the surface modification. Reduction of friction and wear loss between ball and raceway of bearings is very important goal of the development of bearing technology. Low friction and wear have a positive effect on extending fatigue life, avoiding temperature rise, and preventing premature failure of bearings. Therefore, this example is aimed at investigating the effects of micro tracks and micro dimples on tribological characteristics at the contact between ball and raceway of thrust ball bearings (TBB). In order to make micro tracks and micro dimples on the raceways, the Ultrasonic Nanocrystalline Surface Modification (UNSM) technology was applied using various feed rate widths. The coefficient of friction after UNSM has shown large sensitivity and significantly reduced by 40% that plays key role in improving tribological properties of mating surfaces. Moreover, peak torque of untreated and treated using various feed rate widths surfaces were measured which were about 35% lower than untreated one. Further surface analysis revealed irregular distribution of scratches, scars and micro cracks on untreated bearing raceways. However, UNSM applied bearing raceways has no substantial scratches and micro cracks. In addition, the effects with various micro track widths are discussed.

1.1. Introduction

It is widely known that longitudinal ribs on shark skin and dimples on a golf ball reduce drag and friction force dramatically. These nature facts remind that a smooth surface is not always the best. It needs to have dimples in order to acquire a low friction. Hamilton et al. indicated that micro dimples are able to generate additional hydrodynamic pressure to increase the load capacity of the surfaces. This theory has been well accepted and micro dimple effect is regarded as the most dominant effect of surface texture and structure.

Increasing load capacity, decreasing friction and wear rate are among major objectives of bearing design and manufacturing. Those objectives will prolong the mean service life, reduce the cost, improve energy efficiency and reliability of the bearing systems. So the surface texture, such as micro dimples and micro tracks could be a good approach to improve tribological performances of rolling/sliding surfaces. When the surface structure is transformed into nanocrystalline magnitude the fatigue, wear and friction characteristics are getting better. Therefore, this example is aimed to investigate how much the mechanical and tribological properties of TBB (thrust ball bearings) could be improved by the surface of micro dimples and micro tracks.

1.2 Experimental Details

1.2.1 UNSM Technology

Figures 13A, 13B:
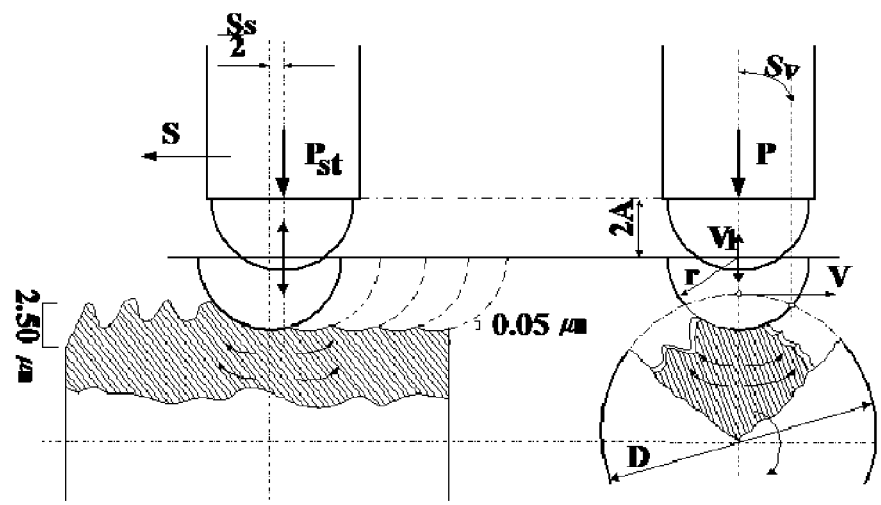
FIGS. 13A and 13B are schematic views of UNSM basic mechanism.

Referring FIGS. 13A and 13B, UNSM technology was developed by DesignMecha Company. The tungsten carbide ball attached to the ultrasonic device strikes the surface of a workpiece 20,000 to 40,000 times per second and 1,000 to 4,000 shots per square millimeter on the work surface. These strikes, which can be described as micro cold forging, bring severe plastic deformation to the work surface and induce nanocrystalline microstructures and deep compressive residual stresses in the surface layer. In FIGS. 13A and 13B: F=Pst+Psin2πft; where: F—total striking force; Pst—normal static load onto the tool; P—amplitude of dynamical load; A—amplitude; V—speed(m/min); S—feed (mm/rev); r—ball radius; D—specimen diameter; f—frequency of oscillations; t—current time.

Table 2 contains a description of the principal parameters of UNSM technology for treatment.

TABLE 2

| Principal parameters of UNSM technology | | | | |
|---|---|---|---|---|
| Amplitude (μm) | Load (N) | Speed (m/min) | Feed (mm/rev) | Tip diameter (mm) |
| 30 | 60 | 30 | 0.05, 0.07, 0.1 | 2.38 |

1.2.2 Test Specimens and Rig

1.2.2.1 Thrust Ball Bearing

Figures 14A, 14B:
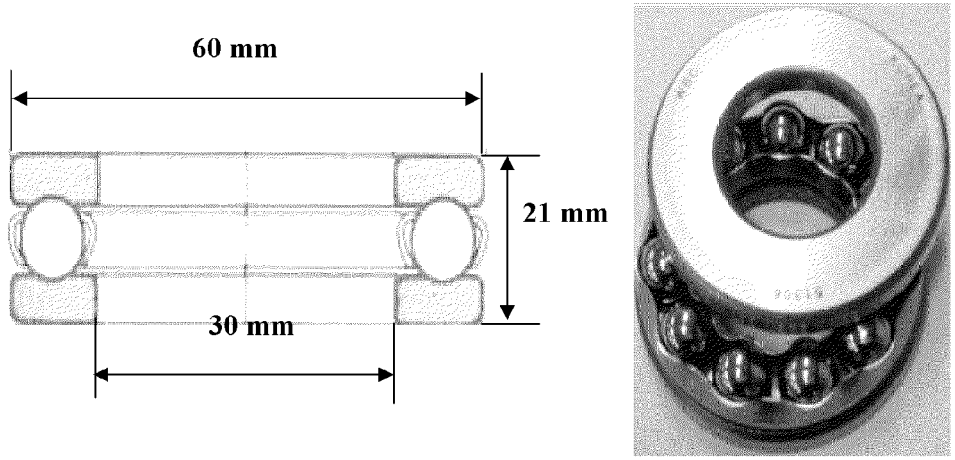
FIGS. 14A and 14B are views of used thrust ball bearing as a specimen in Example 1.

TBB made of SAE52100 was used as a specimen to perform tests. The bearing and its dimensions are shown in FIGS. 14A and 14B. TBBs were treated by UNSM using various feed rate widths to obtain the surface roughness of Ra around 0.1 μm.

1.2.2.2 Test Rig and Test Procedure

In Example 1, disc-on-disc tester was used to measure friction torque as shown in FIGS. 15A and 15B. TBB ring (shaft washer) is inserted into rotating holder which is connected to the torque-cell shaft. Another part of TBB ring (housing shaft) is also inserted into fixed holder. This design allows the TBB raceway-ball-raceway interactions mating surface aligning the same condition while using each bearing. Friction torque is derived by torque-cell. Input rotation speed, applied load and test duration time are controlled by computer. Tonna Oil was used as the lubricant in order to minimize ball/raceway conjunction friction. It's viscosity is 0.13 $Ns/m^2$ at 40° C.

TABLE 2A

| Test condition | | | | |
|---|---|---|---|---|
| Load (N) | Rotation speed (rpm) | Oil temp. (° C.) | Lubrication oil | Test duration time, (sec) |
| 200-800 | 300-1100 | up to 17 | Tonna Oil 32 | 60 |

1.3 Results and Discussion

1.3.1 Surface Roughness and 3D Topology

The experimental analysis was carried out comparing the performances of UNSM treated TBBs using various feed rate widths and untreated TBBs under the same tribological conditions, repeating each individual test in order to verify the effect of the micro dimples and micro tracks. Surface roughness counter to the rolling direction at the center of raceway was measured. FIG. 16 indicates a comparison of surface roughness and hardness before and after UNSM at different surface condition. Surface topologies in FIG. 17 show that TBB raceway surface is covered with micro dimples and micro tracks and hair cracks were relieved by UNSM, which was not formed on ground surface. Scratches were found on untreated TBB surface, but micro dimples and micro tracks were well formed after UNSM. This is thought to promote the decrease of friction whilst occurs rolling in the interaction contact of ball and raceway.

Friction reduction is caused by grain refinement after UNSM. Deformation-induced transformation mechanism can explain surface hardening through compressive residual stress and increase in dislocation density.

Figure 17A:
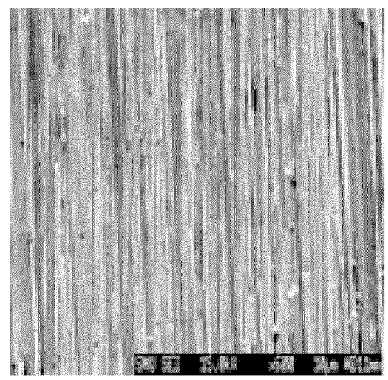
FIG. 17A shows thrust ball bearing surface topology before and after UNSM.
Figure 17B:
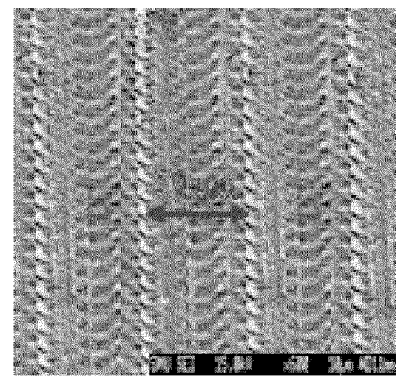
FIGS. 17B-17D show thrust ball bearing surface topologies after UNSM at 50 μm, 70 μm and 100 μm, respectively.
Figure 17C:
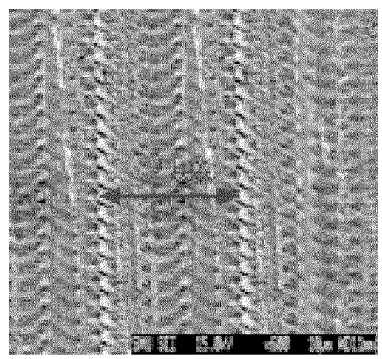
Figure 17D:
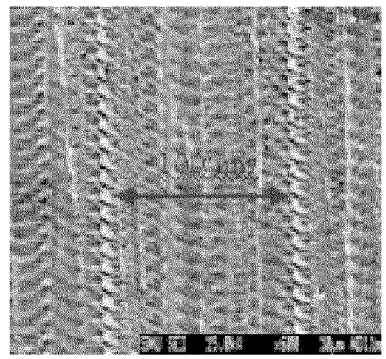

Referring to FIGS. 17B-17D, the intervals between tracks are 50, 70 and 100 μm and the dimple size is 5~10 μm.

Improved surface roughness, increased surface hardness, fine texture structure, micro dimples and micro tracks reduce the friction and lubrication effects which are important in bearings through distribution of stress concentration and oil pocket volume effect.

1.3.2 Friction of Thrust Ball Bearings

Figure 18A:
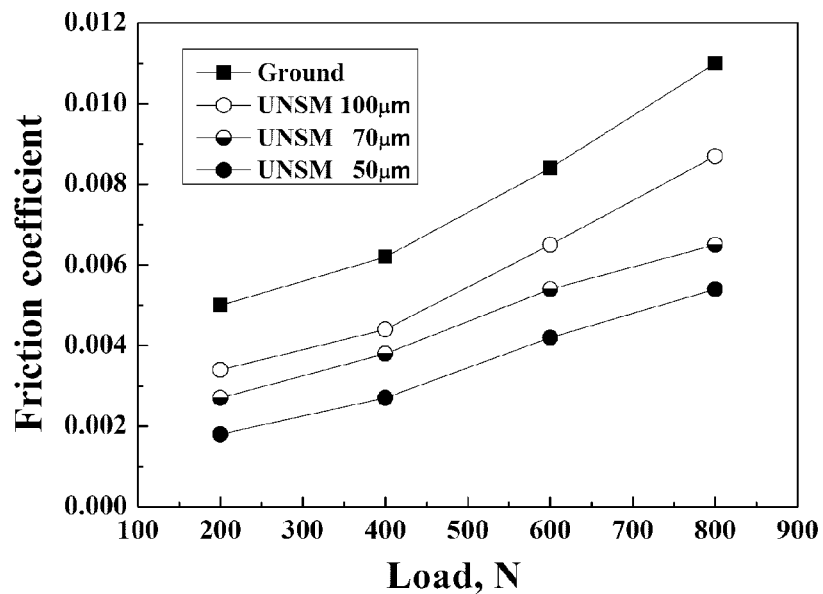
FIG. 18A shows friction coefficients before and after UNSM as a function of load.
Figure 18B:
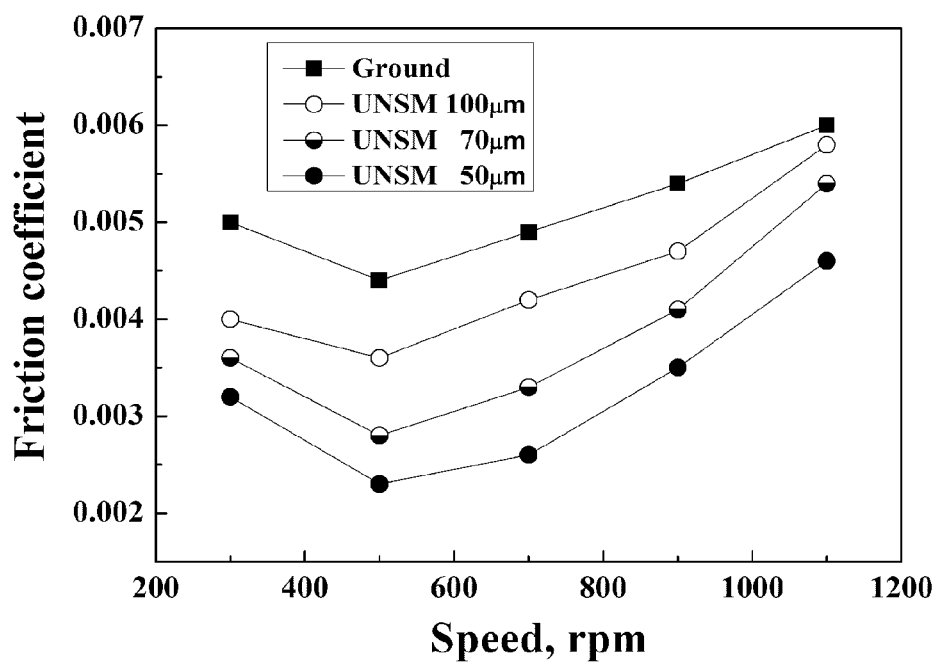
FIG. 18B shows friction coefficients before and after UNSM as a function of rotation speed.

FIG. 18A shows the result of variation of friction coefficient at different load, and FIG. 18B shows the result of variation of friction coefficient at different rotation speed, indicating that boundary lubrication played a dominant role after wear occurred at the conjunction of ball and raceway. The main reason for this reduction is the presence of micro dimples and micro tracks and surface characteristics. In addition, great number of micro dimples and micro tracks are formed at 50 μm feed rate width than the others and also greater number of strikes per square millimeter. These micro dimples and micro tracks have significant effect to reduce friction at the ball and raceway conjunction.

Figure 19A:
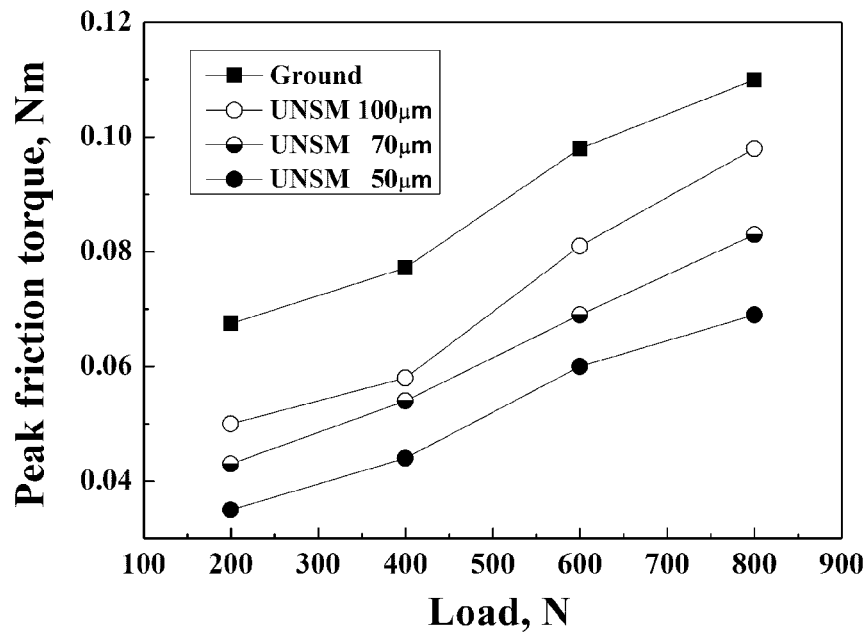
FIG. 19A shows peak torque before and after UNSM as a function of load.
Figure 19B:
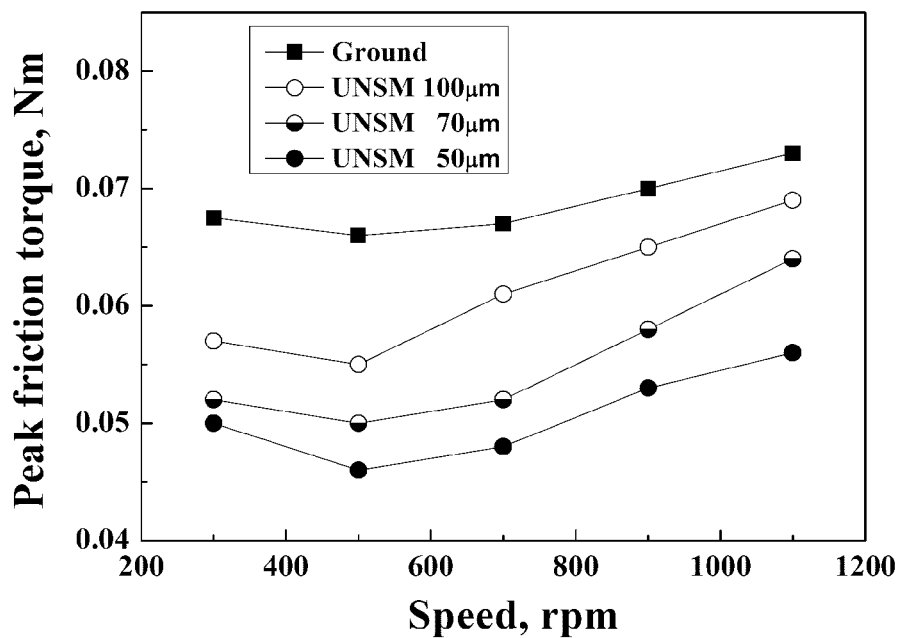
FIG. 19B shows peak torque before and after UNSM as a function of rotation speed.

Peak torque value at different load increased with increasing load, but the minimum values occurred in UNSM applied surface at feed rate width of 50 μm as shown in FIGS. 19A. As shown in FIGS. 19B, when the rotation speed is low, the friction torque did not decrease much at ground surfaces, whereas significantly decreased on UNSM applied surfaces. This variation is thought to happen due to micro dimples and micro tracks because it is in mixed and boundary lubrication regime.

1.4 Conclusions

An experimental work was carried out on TBB made of SAE52100. Tribological tests were performed in full lubrication condition and configuration showed an improvement of friction behavior ascribed to the well-known hydrodynamic lift effect ensured by micro dimples and micro tracks. Average friction coefficient was observed to be significantly reduced by comparing untreated and treated ones using various feed rate widths. As the ball cycles on the TBB raceway, pure rolling takes place only at two points. In the center of the mating surfaces, backward sliding occurs, and forward sliding occurs at the end. The additional stress due to this forced sliding leads to the deformation. Observed scratches on untreated bearing surface were irregularly distributed, but micro dimples and micro tracks were well formed at the bearing raceway after UNSM. It was well-defined that the presence of micro dimples and micro tracks on mating surfaces improve tribological performance. The test results show at most 40% friction reduction after application of UNSM to the TBB raceway surface comparing to the untreated one. Relatively efficient performance is witnessed when surface was treated at 50 μm feed rate width. The reduction of peak torque at the boundary and mixed lubrication regimes after UNSM gives good effect to increase the service life of bearings. The reduction of friction coefficient at the mixed and full hydrodynamic regimes after UNSM also gives very good effect to improve the energy efficiency. The major effects for this reduction at three lubrication regimes could be explained in terms of micro dimples and micro tracks emerged surface.

EXAMPLE 2

Tribological Characteristics of Radial Journal Bearings by Ultrasonic Nanocrystal Modification Technology Ultrasonic nanocrystal surface modification (UNSM) has applied to a radial journal bearings made of bearing steel SUJ2. Mechanical characteristics are compared between UNSM treated and untreated bearings. Friction torque is measured at the boundary lubrication condition, the mixed lubrication condition, and the full hydrodynamic lubrication condition. The peak torque at the boundary lubrication condition and the transition period to mixed lubrication condition on the UNSM treated samples are reduced. These effects are very useful to improve the service life of journal bearings. The Stribeck curve at the mixed and full hydrodynamic lubrication is derived and compared. The friction coefficient at these two regimes is reduced by more than 50%, which will do effective role for improvement of energy efficiency. The major effects for this reduction at three lubrication regimes could be explained in the terms of micro dimple surface.

2.1 Introduction

Radial journal bearings (JB) are very common engineering components, which are used in diverse types of machinery. Combustion and turbine engines depend virtually on journal bearings to obtain high efficiency and reliability. Increasing load capacity and service life, decreasing friction coefficients and improving reliability are major goals of JB design and manufacturing in order to improve energy efficiency and to reduce life cycle cost of the JB systems. There are many different approaches to solve these problems, such as the development of new materials, the novel design of JB shapes and lubrication system, the surface modification, and etc. In this study, UNSM technology is applied to JB surface in order to give a solution for these goals. Particularly, its effect to Stribeck curve during mixed and full hydrodynamic lubrication and friction torque behavior during boundary lubrication.

Figure 20:
FIG. 20B shows a UNSM Device with CNC Turning Machine.

UNSM technology is a technology which was developed by DesignMecha. The main concept and mechanism of UNSM shown in FIGS. 13A, 13B and 20 is as following. A tungsten carbide ball attached to an ultrasonic device strikes the surface of a workpiece 20,000 or more times per second with 1,000 to 10,000 shots per square millimeter. These strikes, which can be described as micro cold forging, bring severe plastic deformation to surface layers and thus induce nanocrystalline structure. The nano-structural modification of the surface layer can improve both the strength (hardness) and ductility (toughness) of the workpiece simultaneously according to the well-known Hall-Petch theory (Hall, 1951, Petch, 1953). This process also improves surface integrity and surface hardness, makes micro dimples, and induces compressive residual stress on surface layers. The UNSM effects and their anticipated benefits are summarized in Table 3.

TABLE 3

The effects of UNSM treatment and their anticipated benefits.

| Effects of UNSM treatment | Anticipated benefits |
|---|---|
| Deep compressive residual stresses (Greater than 1000 MPa into depths of more than 2000 μm) | Improved LCF and HCF endurance limit<br>Improved rolling contact fatigue strength<br>Improved stress corrosion cracking resistance |
| Micro dimples surface (Area: 1-2 μm$^2$, Depth: sub-micron, Pattern pitch: few pm) | Reduced surface roughness<br>Decreased friction coefficient<br>Reduced wear rate |
| Increased hardness (into depths of more than 1500 μm) | Reduced wear rate<br>Improved LCF and HCF endurance limit |
| Nanocrystalline structure (Grain sizes of 50-200 nm into depths of 100 μm) | Increased tensile strength and hardness<br>Increased fatigue strength<br>Increased wear resistance |

2.2 Experiments

2.2.1 Test Specimens

Figure 21:
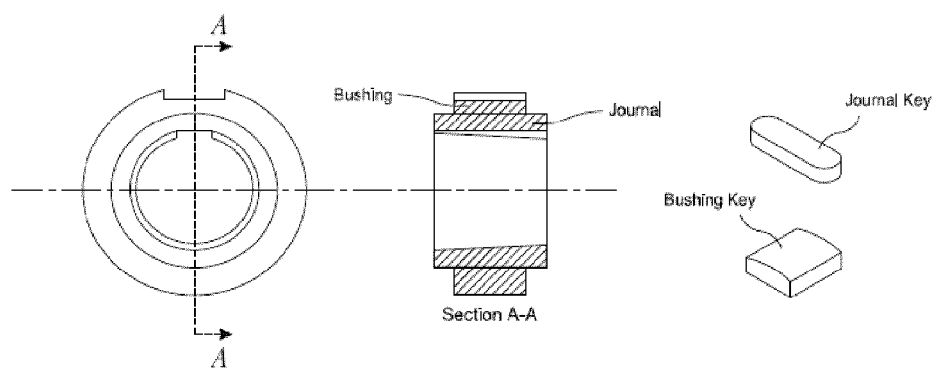
FIG. 21 shows a bushing and journal assembly.

The specimens are made of bearing steel SUJ2 and shown in FIG. 21. They are divided into two groups: an untreated and UNSM treated bearing surfaces. After UNSM technology the mechanical properties have changed as shown in Table 4. The surface roughness has decreased about by 35% after UNSM treatment. It is very important factor, since it will alter the λ value of bearing lubrication.

TABLE 4

Mechanical properties of the specimens before and after UNSM treatment.

| Mechanical Properties | Before | After |
|---|---|---|
| Surface hardness, HRC | 58-60 | 62-64 |
| Compressive residual stress, MPa | +100~-100 | -600~-800 (till depth 500 μm) |
| Surface roughness, μm | 0.17 | 0.11 |

Geometrical parameters of the specimens are measured and clearance-radius ratio (C/R value) and minimum clearance ($h_{min}$) and (λ value) are calculated as shown in Table 5.

TABLE 5

Geometrical parameters of the specimens.

| Journal surface | Journal average diameter $D_j$, mm | Bushing bore average diameter $D_b$, mm | Clearance C, $(D_b - D_j)/2$, mm | C/R, R-Journal average radius, mm | $h_{min}$, $h_{min}$ = C(1-e) | λ value |
|---|---|---|---|---|---|---|
| Ground | 57.899 | 58.0375 | 0.069 | 0.0024 | 0.0070 | 37.49 |
| UNSM | 57.901 | 58.0675 | 0.083 | 0.0029 | 0.0083 | 64.91 |

In the Table 5;

$$\lambda = h_{min}/\sqrt{R_j^2 + R_b^2} \, ;$$

where $h_{min}$—minimum film thickness; $R_j$ and $R_b$—RMS surface roughness of the journal and bushing respectively. ϵ—eccentric ratio, the ratio of eccentricity to clearance (e/C).

2.2.2 Test Bench and Condition

FIG. 22 shows a test bench used in Example 2. Its main characteristics are given in Table 6.

TABLE 6

Radial journal bearing test machine specifications.

| Equipment name | Equipment specifications |
|---|---|
| AC electric motor | 5.5 kW, 1160 rpm |
| Flexible shaft coupling | The ultimate coupling from 0.1-10.000 Nm |
| Torque and RPM transducer | Max. 100 kgf.m, 1-20.000 rpm |
| Reducer | WU 135, ratio 1/20 |
| Data acquisition | Somat eDAQ-lite |
| Temperature sensor | Measuring range −40~+160° C. |
| Used oil | SAE 80W-90 |

During test, the oil temperature remained 25-30° C. with corresponding dynamic viscosity 0.32-0.23 Ns/m². Applied input test conditions are given in Table 7.

TABLE 7

Applied test conditions.

| Radial load | 10000 N |
|---|---|
| Test duration | 10 minutes at each rpm |
| Input rpm | 10→20→30→40→50→60→10→9→8→7→6→5→4→3→2→1 |

The mean frictional torque was taken into account while plotting the friction factor versus the Sommerfeld number "Eq. (1)":

$$S = \frac{\mu n}{P}\left(\frac{R}{C}\right)^2 \qquad (1)$$

where: μ—dynamic viscosity, Ns/mm²; n-shaft rotation speed, rpm; P—Nominal pressure, MPa; R—journal bearing outer radius, mm; C—clearance between journal bearing and bushing.

2.2.3 Surface Roughness and 3D Topology

The journal bearing surface roughness measured using Mitutoyo SJ-400 indicating $R_a$=0.17 μm (average). However, after UNSM treatment, a surface roughness decreased to Ra=0.11 μm (average). 2D and 3D scanning of the surface topology shows that hair cracks were relieved and micro dimples emerged after applying UNSM treatment as shown in FIGS. 23A and 23B.

Oil trap volume at the surface is also measured before ($R_{vk}$=30.362) and after UNSM treatment ($R_{vk}$=39.384) whose increased value by 30% will do very important role at the boundary lubrication regime.

2.3 Results and Discussion

2.3.1 Results of Test: Peak Torque and Stribeck Curve

The peak torque at the boundary lubrication condition and transition period from boundary to mixed lubrication condition, friction torque at the mixed and full hydrodynamic lubrication are measured and their average value are given in Table 8. The Stribeck Curve (FIG. 24) is derived at the mixed and full hydrodynamic lubrication using this Table 8.

TABLE 8

Final averaged torque results.

| | Peak torque, Nm | Transition period, sec | Average friction torque, Nm | | | | | |
|---|---|---|---|---|---|---|---|---|
| | | | 10 rpm | 20 rpm | 30 rpm | 40 rpm | 50 rpm | 60 rpm |
| UNSM | 46.961 | 3.0375 | 0.214 | 0.315 | 0.380 | 0.395 | 0.383 | 0.345 |
| Ground | 51.605 | 3.1166 | 0.648 | 0.771 | 0.838 | 0.871 | 1.100 | 0.848 |

2.3.2 Discussion

The value of peak torque and the period of transition to mixed lubrication after UNSM treatment are reduced by about 10% and 3% respectively comparing to those of before UNSM treatment. The increased oil trap volume on the micro dimple surface after UNSM treatment did main role for this effect. The friction coefficient at the mixed lubrication after UNSM treatment is reduced about 50% comparing to that of before UNSM treatment as shown FIG. 24. The reduction ratio of friction coefficient at the full hydrodynamic lubrication after UNSM treatment comparing to that of before UNSM treatment is getting bigger as shown FIG. 24. Micro dimple phenomena on surface layer after UNSM treatment also did major role for these effect.

2.4 Conclusions

The peak torque at the boundary lubrication condition and the transition period to mixed lubrication condition, and the Stribeck curve at the mixed and full hydrodynamic lubrication are measured and compared between UNSM treated and untreated JB. The reduction of peak torque at the boundary lubrication regime and the period of transition to mixed lubrication after UNSM treatment will give good effect to increase the service life of JBs. The reduction of friction coefficient at the mixed and full hydrodynamic regimes after UNSM treatment will also give very good effect to improve the energy efficiency. The major effects for this reduction at three lubrication regimes could be explained in the terms of micro dimple surface, but still only qualitative explanation.

EXAMPLE 3

Rolling Contact Fatigue and Friction Torque Characteristics of SAE52100 by Ultrasonic Nanocrystal Surface Modification Technology UNSM (Ultrasonic Nano crystal Surface Modification) technology has been applied to the test specimens of bearing rings and rollers made of SAE52100. Mechanical properties, especially rolling contact fatigue characteristics, are analyzed using two-roller test and 6-ball test before and after UNSM treatment. The difference of friction torque of bearings before and after UNSM treatment is also analyzed. The main effects to improve rolling contact fatigue characteristics by UNMS treatment are explained in the view points of residual stress, hardness and retained austenite. The decrease of friction torque can be explained through the effect of micro dimples induced by UNSM.

3.1 Introduction

Bearings are used as essential parts of machines in almost all industries including steel industry, automobile industry, power plants and airplane parts which are used for rotation movement in power transportation systems. The quantity and market of various domestic bearings are very large, but almost all of the special bearings used in decelerators, huge rollers in steel plants, aero and marine vehicles are depending on the imports from Japan and European countries because of difficulties in design and processing technologies.

Life of a bearing is expressed as a counting number of bearing until flaking occurs at the rolling contact surface because of fatigue caused by repeated loading. In order to improve Dynamic Load Rating/Static Load Rating ratio, which represents toughness and durability of bearings, all technologies including material, processing, heat treatment and surface treatment are condensed, and the most basic technologies about materials and surface treatment are arising these days. Bearing steels require good resistance to wear and rolling contact fatigue, and corrosion resistance and heat resistance are also required depending on the application conditions. So the studies about improving mechanical properties of bearing materials for good resistance to wear and fatigue are under progress.

And the high speed operation of various machines results in increase of occurring frequency of early failure of bearings because of rolling contact fatigue, which requires development of materials with higher resistance to rolling contact fatigue. The studies about improving mechanical properties of materials through making the grain size of base materials as nano crystalline are under active progress these days. The mechanical properties of contact area between inner and outer parts of bearings and bearing balls can be improved by making the metallurgical structure nano crystalline, which makes production of bearings with good quality possible. For this purpose the development of new technologies to improve fatigue life is processed exclusively only by advanced countries, and the technologies are also considered as top secret without permitting even discussion for technology transfer.

The study about fatigue life is one of the very complicated and difficult technologies depending on application conditions such as fatigue fracture by bending or torsion, performance degradation by wear, and efficiency decrease by degradation of friction characteristics. In addition to basic and traditional technologies such as special alloys and heat treatment to solve the problem of fatigue life, surface treatment technologies to improve fatigue life through improvement of mechanical characteristics of surface area where fatigue life characteristics are strongly dependent are under big progress in the industries these days.

Therefore the purpose of this study was to try to solve the effects of surface hardness, distribution of compressive residual stress, variation of retained austenite and surface dimple structure formation on the fatigue behaviour mechanism with two types of rolling contact fatigue characteristics in SAE52100 bearing material using application technology so called Ultrasonic Nano crystal Surface Modification (UNSM) technology to be applied to inner and outer surfaces of bearings.4 And the variation of friction torque values of thrust bearing which is used in the real field was also measured to analyze the start-up effect of boundary lubrication.

3.2 Experimental Procedures

3.2.1 Materials

Figures 24, 25A:
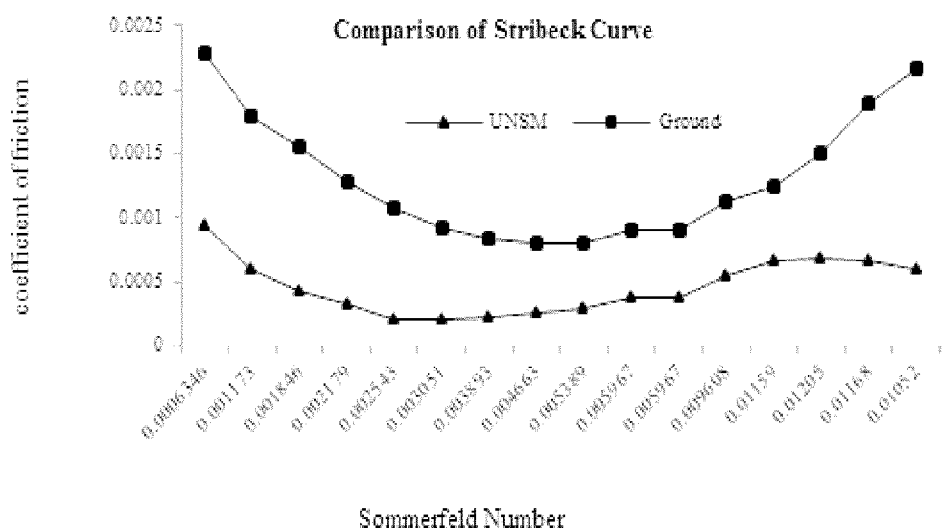
FIG. 24 shows comparison of Stribeck curves.
FIGS. 25A and 25B shows Dimension of specimen for rolling contact fatigue test for (a) Two-roller type and (b) 6-ball type, respectively.
Figure 25B:
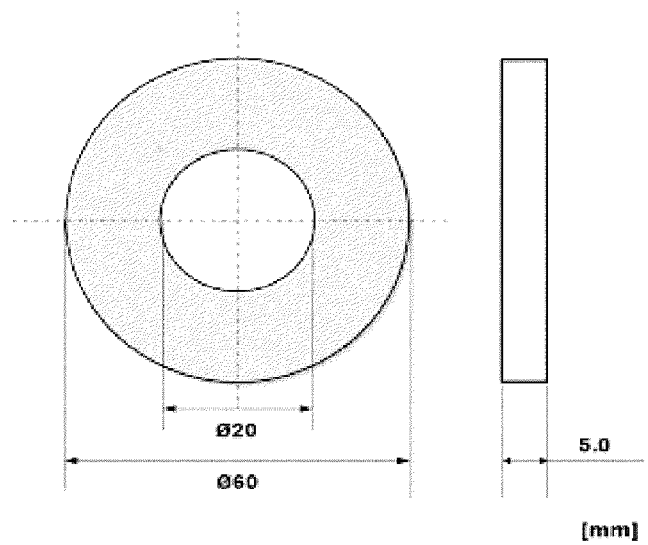

The material used for this study was SAE52100(JIS SUJ2R) bearing steel and its chemical composition is given in Table 9. Two types of specimens were made for rolling contact fatigue test as shown in FIGS. 25A and 25B. Cylindrical specimens of ϕ15×30 mm were prepared for two-roller type test and circular specimens were prepared for 6-ball type test. All were manufactured through super fine finishing because surface condition affects the test results. As shown in Table 10, specimens were annealing treated for 2.5 hrs at 850° C. and then quenched in oil bath. They were tempered for another 2 hrs at 180° C. after examining the existence of micro cracks and deformation.

TABLE 9

Chemical composition of SAE52100(wt. %)

| C | Si | Mn | P | S | Ni | Cr | Mo | Cu |
|---|----|----|---|---|----|----|----|----|
| 0.98-1.10 | 0.15-0.35 | 0.25-0.45 | 0.025 | 0.008 | 0.025 | 1.39-1.60 | 0.06 | 0.35 |

TABLE 10

Heat treatment condition of specimens

| Heat treatment | Hardness |
|---|---|
| Martensitic hardened + tempered at 180° C/2.0 h | Hv = 700~750 |

3.2.2 UNSM Treatment

Figure 26:
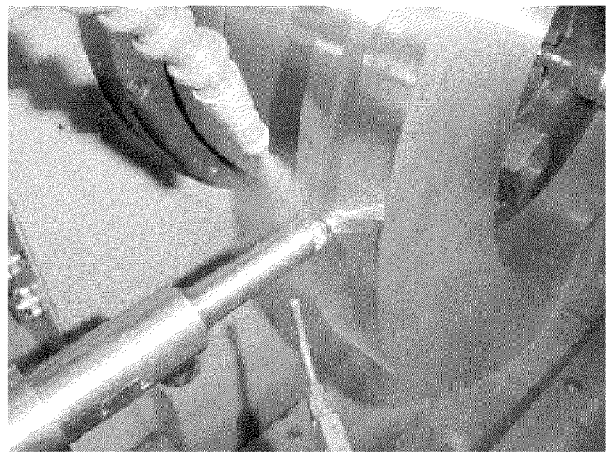
FIG. 26 shows UNSM device with CNC turning machine.

UNSM technology is a technology which applies very large static and dynamic loads using ultrasonic vibration energy. A generator transmits a high frequency into transducer which is made of several packages of PZT ceramics. Then the induced vibration is transmitted as like sonic via guiding and amplifying systems which is consisted of horn and tools. Finally this vibration is transformed to physical vibration at the tip of tool. This tip is usually made of tungsten carbide ball of 2.3 mm diameter with hardness of Hv=1600, and strikes the surface of a workpiece 20,000 or more times per second with 1,000 to 4,000 shots per square millimeters. Smaller ball produces higher hardening effect through stress concentration. This strike produces severe plastic deformation to the surface layer inducing nano crystalline structure and large and deep compressive residual stress. Basic mechanisms for UNSM can be explained as FIGS. 13, 25 and 26, and it can be used for machining objects with circular, flat and free surfaces by attaching to CNC turning machine. The best processing parameters were determined when the generator is stabilized. Frequency of generator was 20 KHz and measuring amplitude was selected as 70 μm. Previous work showed that lower amplitude was good for surface roughness but weak at surface hardening. So test conditions were chosen to be almost 70% of maximum according to surface hardening and dimple structure for high quality bearings, and parameters for UNSM treatment is given in Table 11.

Figure 27:
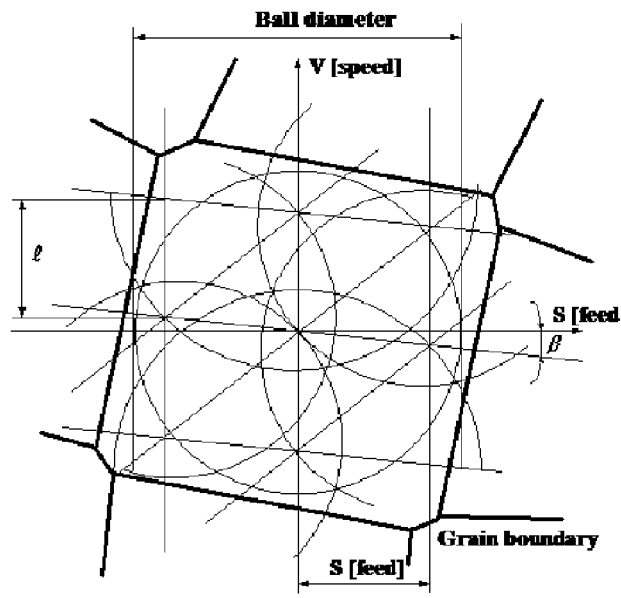
FIG. 27 shows UNSM mechanism for inducing severe elastic deformation.

In FIG. 27, N=60f/$\ell$V; N: Contact count per unit area [mm]; f: Frequency [20 kHz]; V: Speed [m/min]; and l: Feed [mm/rev].

TABLE 11

UNSM parameters for SAE52100

| Amplitude [μm] | Static Load [kgf] | Dynamic Load [kgf] | Speed [m/min] | Feed [mm/rev] | Tip material | Tip diameter [mm] |
|---|---|---|---|---|---|---|
| 50 | 5 | 20 | 30 | 0.07 | Tungsten carbide | 2.3 |

3.2.3 Rolling Contact Fatigue(RCF) Test
3.2.3.1 RCF Test by 2-Roller Type

Figure 28:
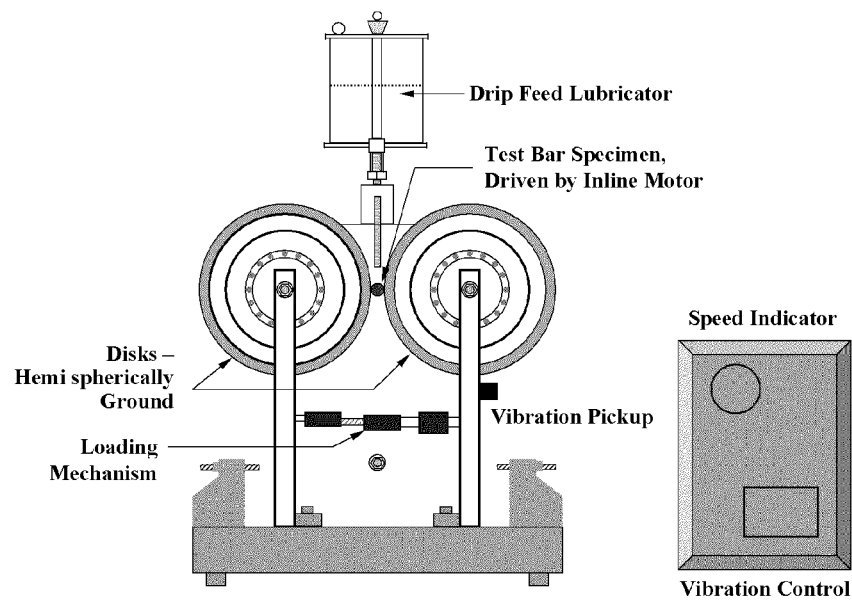
FIG. 28 is a schematic view of a rolling contact fatigue tester (two-roller type).

Cylindrical specimens for rolling contact fatigue test machined as shown in FIG. 25A were measured for surface roughness, dimensions and straightness. Rolling contact fatigue test was conducted under elasto-hydrodynamic lubricating conditions using Polymet-1 RCF tester as shown in FIG. 28. Lubricating oil of Shell Tellus 37 was supplied during test at a rate of 20 drops per minute at contact surface of specimen and disc. The tests were carried out at a rotating speed of 8,000 rpm, and the load applied on the specimen was measured using a strain indicator connected to the load cell. When the vibration level due to flaking reached the preset condition of the sensor, the operation was terminated and the number of rotation was recorded as the rolling contact fatigue life of the specimen. Table 12 shows the test condition for rolling contact fatigue test of two-roller type.

TABLE 12

Test condition of rolling contact fatigue (two-roller type)

| Load (kgf) | Vibrating value for Stop(G) | Rotation speed (rpm) | Lubrication oil |
|---|---|---|---|
| 61-122 | 1.2 (Initial 0.4) | 8,000 | Drop oil per 3 sec |

RCF Test by 6-Ball Type

Figure 29:
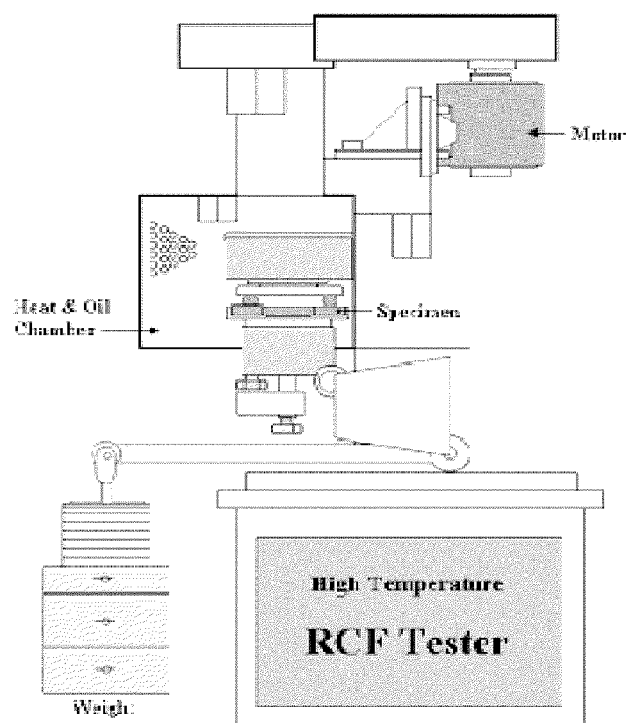
FIG. 29 is a schematic view of 6-ball type RCF tester.

Circular specimens for rolling contact fatigue test machined as shown in FIG. 25B were measured for surface roughness, dimensions and straightness. The specimens were set-up at 6-ball type fatigue tester as shown in FIG. 29, and rolling contact fatigue test was conducted under elasto-hydrodynamic lubricating conditions at a rotating speed of 1,000 rpm and load of 551 kgf. Load is transferred to specimen through bearing balls by applied weights, and the rotation of motor connected to jig makes specimen to rotate resulting in rotation of bearing balls which are in contact with specimen. The load applied on the specimen was measured using a strain indicator connected to the load cell. When flaking occurs on the surface of specimen, the vibration sensor detects it and the operation is terminated, and the number was recorded as rolling contact fatigue life of the specimen. Table 13 shows the test condition for rolling contact fatigue test of 6-ball type.

TABLE 13

Test condition of rolling contact fatigue (6-ball type)

| Load(kgf) | Ball size and No. | Rotation speed(rpm) | Lubrication oil |
|---|---|---|---|
| 551 | ⅜ inch, 6pcs | 1,000 | Automatic Transmission |

3.2.4 X-Ray Measurements
3.2.4.1. Residual Stress Measurement

Residual stress of martensite was measured every 20 μm into depth. Standard Chi-tilt method was used for 7 equi-$\sin^2\Psi$ slopes from $\Psi$=−45° within 2 perpendicular paths. Penetration depth of Cr K$_\alpha$ radiation is τ=4.5 μm and $\Psi$=0°. Reflection peaks from martensite (211+112) planes were detected at 2θ=~156.1° and the width from peak maximum was ~10°. Measurement was conducted in the range of 2θ=145~157.9° with 0.02° of scan step and 0.5°/min. of scan speed. Two-axis plane stress state is calculated from the values tested for every depth and interplanar spacing, $d_0$, without stress is calculated using Hauk-Döle method. Analysis of stress-deformation was conducted using classical algorithm method of Hauk. Stress transformation was conducted using measured standard deviation of Young's modulus, E=201GPa, Poisson's ratio, ν=0.277. Movipol-3 electropolisher of Struers, Sweden was used to measure the residual stresses in depth, and mixture of 200 ml of Electrolyte I (2-Butoxyethanol 10%+Ethanol 75%+Water 15%) and 200 ml of Electrolyte II (Perchloric acid 50%+Water 50%) was used in 1:1 ratio, and measurement parameters are summarized in Table 14.

TABLE 14

Summary of X-ray diffraction instrumental parameters for RS measurement

| | |
|---|---|
| Radiation | Cr Kα |
| Reflection | Martensite (211)(112) at 2θ~157.9° |
| Distance from focal spot to specimen X-ray optics | Cylindrical collimator with ~0.1° deg. |
| Detector type | Scintag solid state |
| Goniometer | RINT2000 wide angle |
| Tilt method | Standard chi |
| Peak position determination method | Symmetric Pearson VII peak shape. No Lorentz polarization absorption correction. |

3.2.4.2. Retained Austenite Analysis

Retained austenite was determined by X-ray diffraction method measured from different depths of trace. Cu Kα radiation was used instead of Cr Kα radiation because of large width of diffraction peak from retained austenite, and penetration depth of Cu Kα radiation was 1.5 μm. Analysis was made using (200) retained austenite peak at 2θ=60° and martensite doublet of (211)(112) at 2θ=67.5°. Measurement was conducted in the range of 2θ with 0.02° of scan step and 0.5°/min. of scan seed and measurement parameters are summarized in Table 15.

TABLE 15

Summary of X-ray diffraction instrumental parameters for RA measurement

| | |
|---|---|
| Radiation | Cu Kα |
| Reflection | Martensite (211)(112) at 2θ~67.51° |
| Distance from focal spot to specimen X-ray optics | Cylindrical collimator with ~0.02° deg. |
| Detector type | Scintag solid state |
| Goniometer | RINT2000 wide angle |
| Tilt method | Standard chi |
| Peak position determination method | Symmetric Pearson VII peak shape. No Lorentz polarization absorption correction. |

3.2.5 Friction Torque Measurement

Figure 30:
FIG. 30 shows a tested thrust ball bearing.
Figure 31:
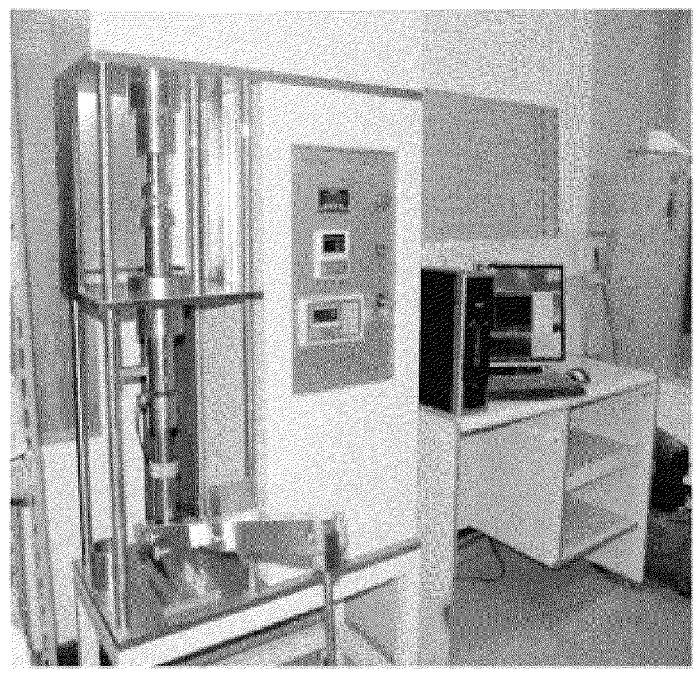
FIG. 31 shows a friction torque tester.

Thrust ball bearings (FIG. 30) with 11 balls of 72×72×19 size were set up at friction torque tester as shown in FIG. 31, and test was conducted under elasto-hydrodynamic lubricating condition at a rotating speed of 500 rpm and load of 200~800 kgf. Load is applied to specimen by weight from the beneath and the rotation of motor connected to jig to support bearing makes the specimen to rotate. Torque meter is attached and the load applied on the specimen was measured using a strain indicator connected to the load cell. Table 16 shows the test condition for friction torque measurement.

TABLE 16

Test condition of friction torque

| Load(kgf) | Ball size and No. | Rotation speed(rpm) | Lubrication oil |
|---|---|---|---|
| 200~800 | 11 mm, 11pcs | 500 | Shell Tellus Oil 37 |

Figure 32A:
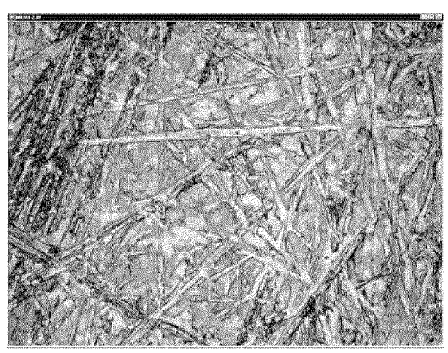
FIG. 32A shows surface topology of SAE52100 before UNSM (Ra=0.1901 μm)
Figure 32B:
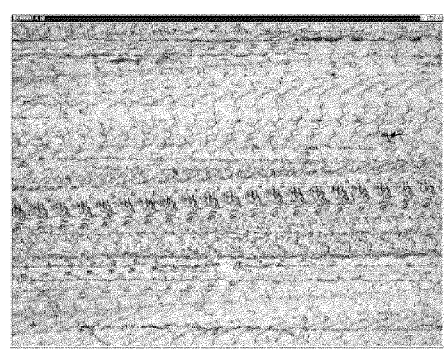
FIG. 32B shows surface topology of SAE52100 after UNSM (Ra=0.1089 μm).

3.3 Results and Discussions
3.3.1. Surface Roughness and Micro Hardness
3.3.1.1. Surface Roughness FIGS. 32A and 32B show the surface states and roughness of RCF specimens before and after UNSM treatment. Surface roughness was measured as Ra=0.1901 μm before UNSM treatment and Ra=0.1089 μm after UNSM treatment, and surface topology showed that constant texture was formed by UNSM treatment, which was not formed at as-ground specimens. Low surface roughness and fine texture structure maximized the friction and lubrication effects which are important in bearing steels through distribution of stress concentration and oil pocket effect.

3.3.1.2. Micro Hardness

Figure 33:
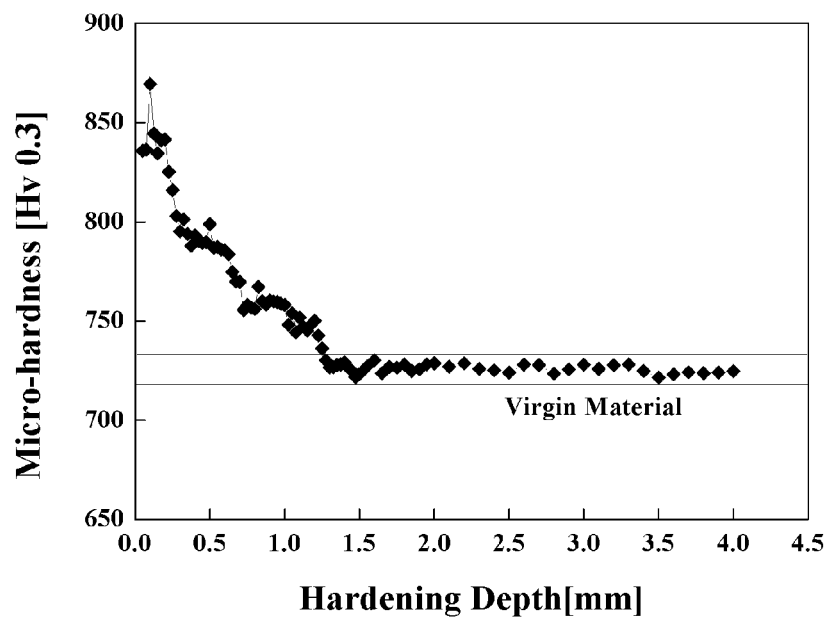
FIG. 33 shows near-surface hardness vs. depth profile of SAE52100 after UNSM treatment.

FIG. 33 shows the variation of micro hardness along the depth from the surface. The effective hardening depth was measured as 1.3 mm, and the surface hardness was measured as Hv=850~880 within 200 μm depth. It is about Hv=130 higher than that of matrix hardness of Hv=730~740. This is caused by grain refinement after UNSM treatment, and deformation-induced transformation mechanism can also explain surface hardening through compressive residual stress and increase in dislocation density.

3.3.2. X-Ray Measurement Results
3.3.2.1. Residual stress

Figure 34:
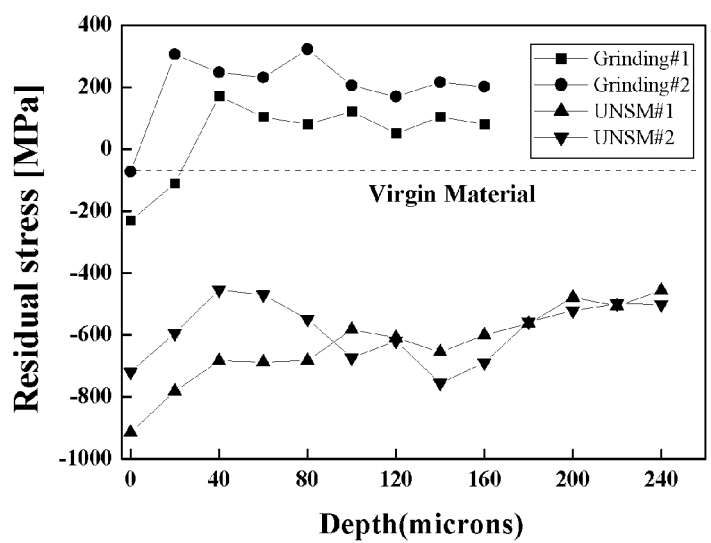
FIG. 34 shows a near-surface residual stress as a function of depth into the surface of SAE52100.
Figure 35:
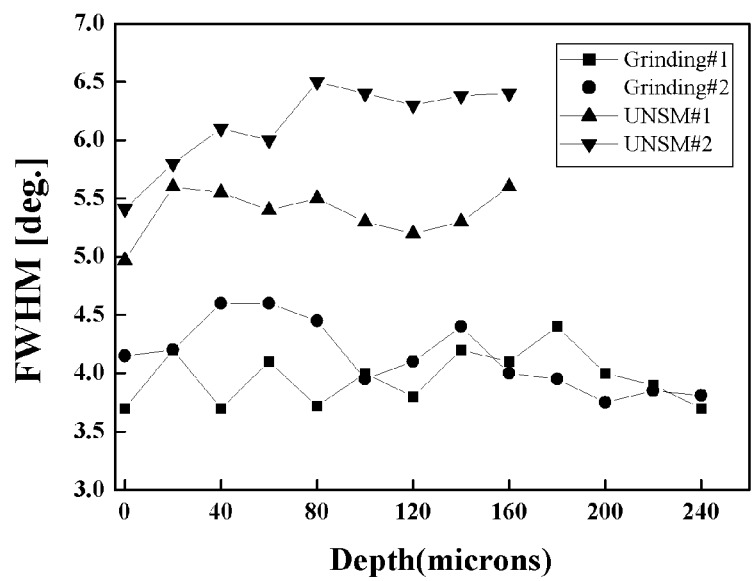
FIG. 35 shows a near-surface FWHM as a function of depth into the surface of SAE52100.

FIG. 34 shows −90~−200 MPa of compressive residual stress in SUJ2(SAE52100 equivalent) specimen before UNSM treatment, and it was changed to tensile residual stress below 20~40 μm from the surface. This is caused by machining effect for specimen preparation, and UNSM treated specimen showed compressive residual stress as high as −700~−900 MPa. It was about −400~−500 MPa at 240 μm depth and the depth of compressive residual stress might be about −600 μm when the slope is considered. So it was identified that there is a difference of −500~−700 MPa in compressive residual stress before and after UNSM treatment. Compressive residual stress is a very important factor for fatigue life improvement, and degree of surface hardening can be identified through Full Width at Half Maximum (FWHM) values as shown in FIG. 35 in addition to surface hardness. FWHM value represents degree of work hardening related with surface hardening mechanism of surface treated metallic materials. And the values of FWHM and compressive residual stress are in positive relation with fatigue life improvement.

3.3.2.2. Retained Austenite

Figure 36:
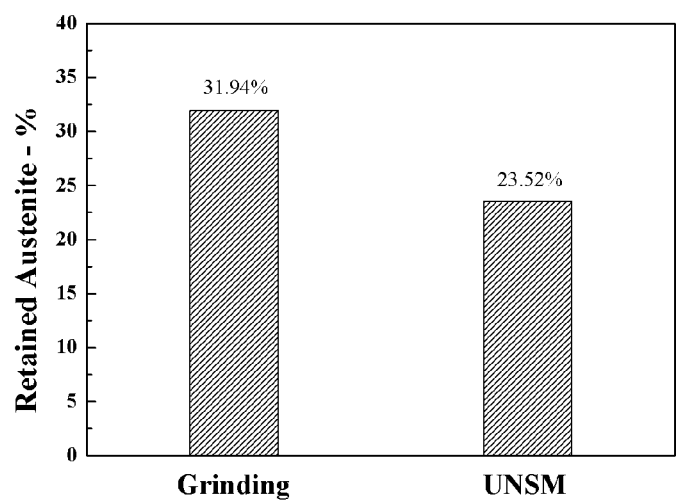
FIG. 36 shows surface retained austenite of SAE52100 before and after UNSM treatment.

The amount of retained austenite from the surface of specimens was quantitatively analyzed using X-ray diffraction method, and the amount was shown to decrease by approximately 8.4% from 31.94% to 23.52% after UNSM treatment as shown in FIG. 36. Application of compressive residual stress as well as decrease of retained austenite by UNSM treatment are important factors affecting the resistance to fatigue, friction and wear in bearing steels. Transformation of retained austenite is based on lattice strain, and retained austenite and residual stress depend on plastic deformation and strain hardening.

3.3.3. RCF Test Results
3.3.3.1. Two-Roller Type Test Results

Figure 37A:
FIG. 37A shows an optical micrograph of race way tested under RCF-1 type (122 kgf, 8000 rpm) before UNSM.
Figure 37B:
FIG. 37B shows an optical micrograph of race way tested under RCF-1 type (122 kgf, 8000 rpm) after UNSM
Figure 38A:
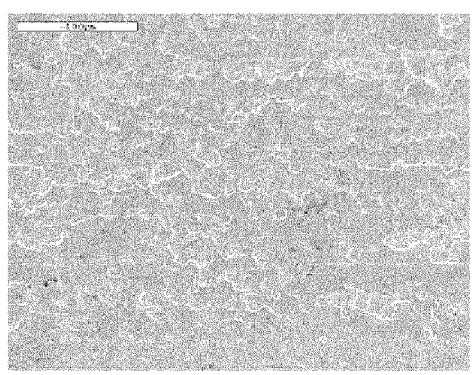
FIG. 38A shows a SEM micrograph of multiple spalling before UNSM.
Figure 38B:
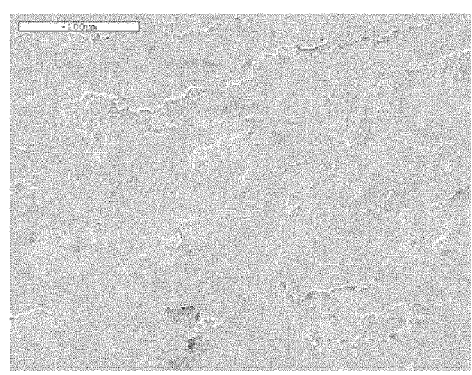
FIG. 38B shows a SEM micrograph of multiple spalling after UNSM.
Figure 39A:
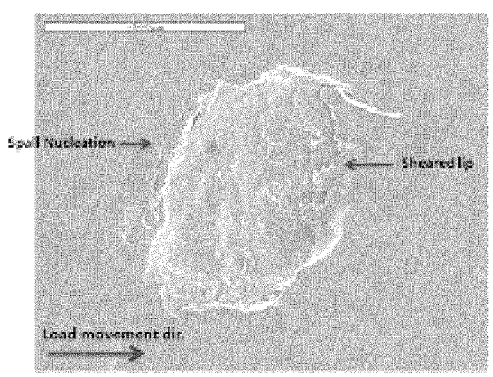
FIGS. 39A and 39B show SEM micrographs of SAE52100 before UNSM.
Figure 39B:
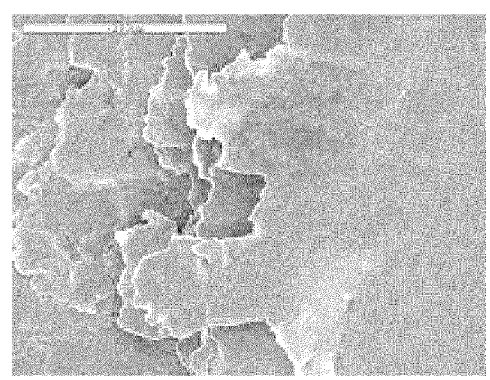

Test result on the effect of repeating load applied to specimen on the rolling contact fatigue life showed that the fatigue life was shortest under 122 kgf and it increased more than 3 times after UNSM treatment even under the same load of 122 kg and rotation speed of 8,000 rpm as shown in Table 17. FIGS. 37A and 37B shows the deformation bands formed from the surface after rolling contact fatigue at the same condition, and these bands were observed at all specimens before and after UNSM treatment. Severe plastic deformation caused by repeated maximum shear stress during rolling contact fatigue test increases dislocation density and stress-induced diffusion of carbon atoms which are super-saturated in surrounding martensite occurs along the high diffusion paths, which results in formation of deformation bands along maximum shear.[16] The deformation bands after UNSM treatment show distributed spallings at the race way, but severe spallings and completely detached surfaces are observed before UNSM treatment. FIGS. 38A and 38B shows multiple spallings were formed across the deformation bands at the surface area, and the density of multiple spallings is much higher in untreated specimens

TABLE 17

Result of RCF test (two-roller type)

| | Before UNSM | After UNSM |
|---|---|---|
| Cycles to failure | 12,960,000 | 40,880,000 |

3.3.3.2. 6-Ball Type Test Results

Rolling contact fatigue life according to variation of repeated loading on specimens was examined upon two specimens of vacuum quenched one and vacuum quench+ UNSM treated one at the same condition of 551 kgf load and rotation speed of 1,000 rpm. As shown in Table 18, the fatigue life was 6.38E+06 cycles before UNSM treatment, and it was increased to 25.69E+06 cycles by UNSM treatment which is about 4 times as large as that of untreated one.

TABLE 18

Results of 6-ball type RCF testing

|  | Before UNSM | After UNSM |
|---|---|---|
| Cycles to failure | 6,380,000 | 25,690,000 |

FIGS. 39A-39D, 40A and 40B show the nucleation and growth behavior of spallings formed at repeated loading during rolling contact fatigue test under the same test condition. The size and depth of spallings before UNSM treatment were 500~700 μm and 101 μm, respectively, and big and micro spallings and multiple sheared lips were found in large area along the direction perpendicular to load movement. The size and depth of spallings after UNSM treatment were found to be 700~800 μm and 258 μm, respectively, and UNSM treated specimens showed enhanced fatigue life and larger size and depth of spallings. Materials fail through nucleation and propagation of cracks by local softening at the area of maximum shear stress, and stress concentration at the defects such as non-metallic inclusions at the surface causes the depth of maximum shear stress smaller. But removal of surface defects, stress distribution by texture structure, and compressive residual stress and deformation-induced transformation of retained austenite after UNSM treatment suppresses nucleation and propagation of fatigue cracks. FIG. 40A shows big spallings formed before UNSM treatment, and FIG. 40B shows micro cracks are distributed in the spalling after UNSM treatment. When the relation between fatigue crack and fatigue life is considered, rolling contact fatigue life can be divided into two terms such as time for fatigue crack nucleation and time for propagation of fatigue crack until spalling. And rolling contact fatigue life depends rather on time needed for nucleation of fatigue crack than on time for growth and propagation of fatigue crack.

3.3.4. Friction Torque of Thrust Ball Bearings

Figure 42:
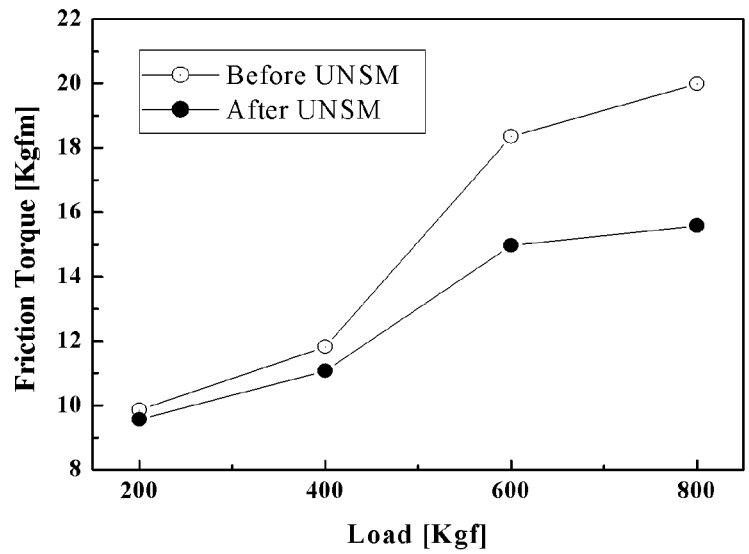
FIG. 42 shows friction torque of before and after UNSM (500 rpm).

FIG. 41 shows the result of friction torque variation at 500 rpm and 800 kgf, and the values were lower in UNSM treated specimen even with similar width with time. Friction torque values increased with load, but the increasing rate was lower in UNSM treated one as shown in FIG. 42. So the gap between them became larger as load increased. When the load is low the friction torque does not decrease much because it is in full hydrodynamic lubrication regime, but when the load is high the friction torque decreases by micro dimples because it is in mixed & boundary lubrication regime. Especially Elasto Hydrodynamic Lubrication (EHL) behavior occurs in this regime, and oil pocket effect by micro dimples delays or suppresses transition to mixed or boundary regime.

Figure 43:
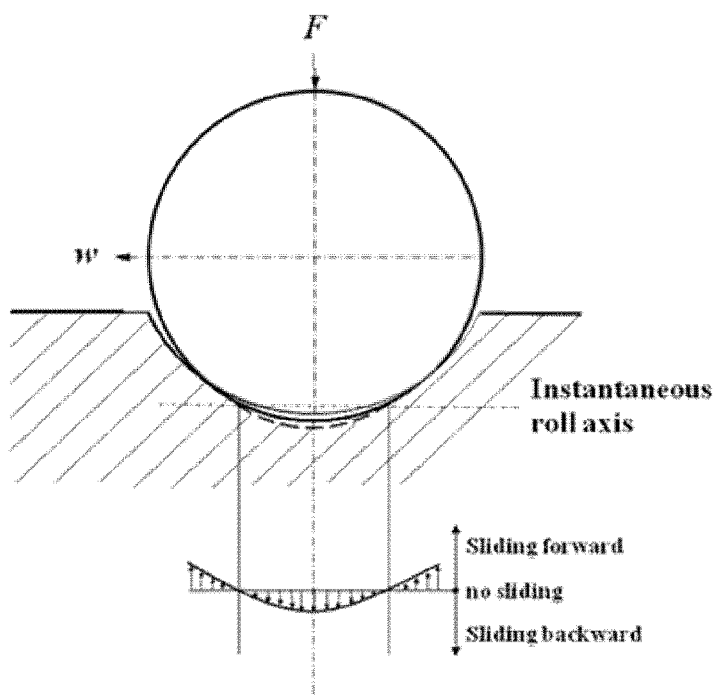
FIG. 43 shows sliding motions provoked by the curvature of the area under pressure.

FIG. 43 shows sliding motion related with rolling contact fatigue mechanism. As the ball cycles in the groove, pure rolling takes place only at two points. In the center of the contact face, backward sliding occurs, and forward sliding occurs at the ends. The additional stress due to this forced sliding leads to the formation of dark areas when etched.

Figure 44A:
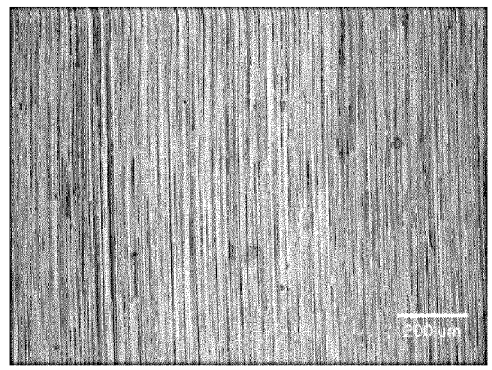
FIG. 44A shows surface topology of thrust ball bearing races before UNSM (Ra=0.22 μm)
Figure 44B:
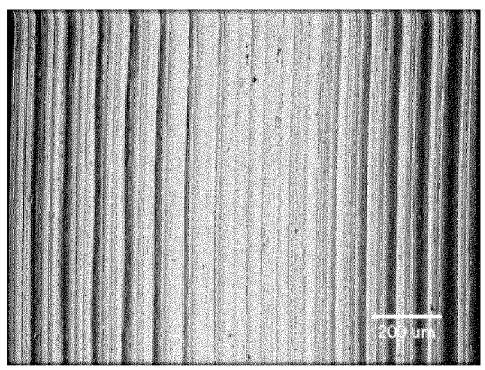
FIG. 44B shows surface topology of thrust ball bearing races after UNSM (Ra=0.27 μm).
Figure 45:
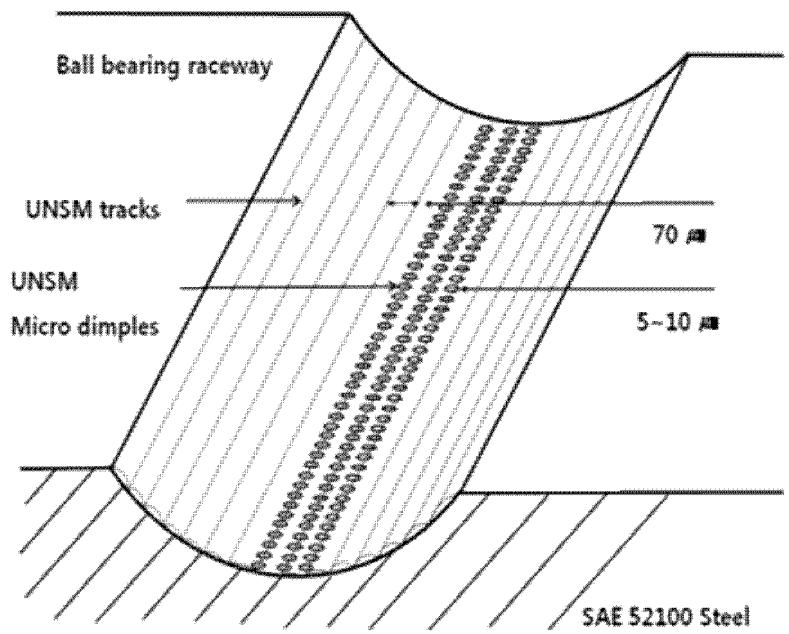
FIG. 45 shows micro dimples and tracks of UNSM.

FIGS. 44A and 44B shows surface topology of real thrust ball bearing and that after UNSM treatment. Surface roughness along the rolling direction at the center of raceway was measured as Ra=0.22 μm before UNSM and Ra=0.27 μm after UNSM. Ground scratches were found irregularly at the surface of thrust ball bearing, but tracks are well formed at the raceway after UNSM treatment. This is thought to affect the decrease of friction torque when sliding of thrust ball bearing. FIG. 45 is schematics for micro dimples and tracks after UNSM treatment, and the spacing between tracks is 70 μm and the dimple size is 5~10 μm. These can be controlled through feed rate and ball size among the parameters for UNSM treatment.

3.4. Conclusions

Figure 46:
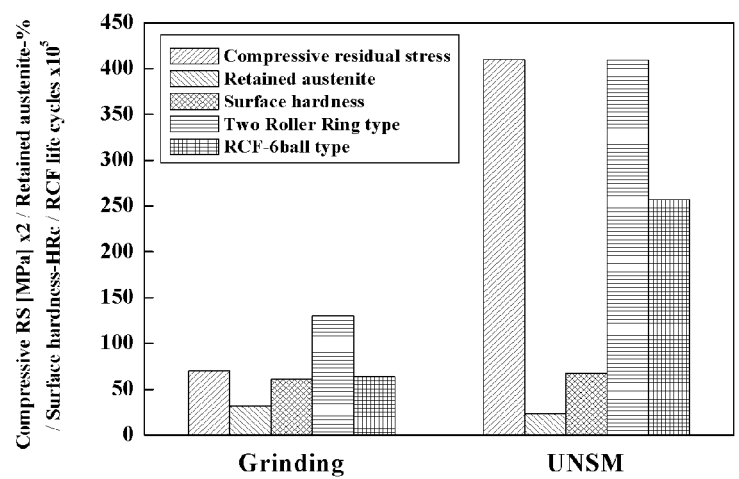
FIG. 46 shows relation between rolling contact fatigue life, residual stress, surface hardness and retain austenite.

Microstructure, fatigue characteristics and residual stress were analyzed for UNSM treated SUJ2(SAE52100) steel to develop high performance bearings with good resistance to rolling contact fatigue, and the following conclusions were made from the results and summarized as FIG. 46.

1) UNSM treatment reduced the surface roughness from Ra=0.1901 μm to Ra=0.1089 μm and increased the micro surface hardness by Hv=130 from Hv=730~740 to Hv=850~880, and the hardening depth was observed as ~1.3 mm. Tensile residual stress was changed to compressive residual stress as large as −700~−900 MPa and FWHM value became about 1.5 times higher. The amount of retained austenite was decreased from 31.94% to 23.52% by UNSM treatment. This can be explained by deformation-induced transformation of surface area showing degree of work hardening, and FWHM and compressive residual stress are in positive relation with fatigue life improvement.

2) Polymet RCF test under same condition showed improved fatigue life from 12.96E+06 to 40.88E+06 cycles in two-roller type test, and from 6.38E+06 to 25.69E+06 cycles in 6-ball type test after UNSM treatment. UNSM treated specimen showed larger spallings than untreated one, but micro cracks were distributed in the inner area. This causes stress distribution until spall nucleation, and fatigue life improvement can be explained by the combined effect of grain refinement, compressive residual stress, retained austenite, and surface topology.

3) Friction torque became much smaller after UNSM treatment when the load increased at 500 rpm, and surface roughness at the raceway center along the rolling direction was measured as Ra=0.22 μm and Ra=0.27 μm before and after UNSM treatment, respectively. Ground scratches were found irregularly distributed at the surface of thrust ball bearing, but tracks are well formed at the raceway after UNSM treatment. This is thought to affect the decrease of friction torque with micro dimples when sliding of thrust ball bearing. Therefore further study about hydrodynamic lubrication is needed for more systematic and theoretical explanations.

What is claimed is:

1. A method of making a bearing, comprising:

providing a bearing intermediate, which is unfinished while having an overall shape of a finished bearing product;

providing a machine comprising a vibration generator, a vibration amplifier and an impacting tip, which form an integrated body, wherein the impacting tip is fixed to the vibration amplifier, which is attached to the vibration generator; and simultaneously applying dynamic load and static load onto a surface of the bearing intermediate with the integrated body to cause plastic deformation of the surface without grinding of the surface, wherein applying the dynamic and static loads repeatedly impacts the surface of the bearing intermediate at one or more ultrasonic frequencies to modify characteristics of the bearing intermediate, wherein the resulting bearing intermediate or finished bearing product comprises a substantial amount of nano-size grains at or underneath the surface, wherein the resulting bearing intermediate or finished bearing product has the following properties:

a roughness value smaller than about Ra 0.19 μm, a hardness value greater than about HRc 60 at the surface, and a compressive residual stress value between about −300 and about −2500 MPa at the surface.

2. The method of claim 1, wherein the nano-size grains are substantially distributed from the surface to the depth of about 100 μm.

3. The method of claim 1, wherein the compressive residual stress value between about −400 MPa and about −700 MPa is found in the depth up to about 200 μm.

4. The method of claim 1, wherein the method does not comprise grinding the surface before or after repeatedly impacting.

5. The method of claim 1, wherein the bearing intermediate is not subject to an additional treatment that causes a significant change in one of roughness, hardness and compressive residual stress thereof.

6. The method of claim 1, wherein providing the bearing intermediate comprises turning a bearing blank and thereafter grinding to make the overall shape of the finished bearing product, wherein the bearing intermediate is not subject to an additional treatment that causes a significant change in one of roughness, hardness and compressive residual stress thereof between grinding and repeatedly impacting.

7. The method of claim 1, wherein the bearing intermediate prior to the repeated impacting is substantially free of nano-size grains.

8. The method of claim 1, wherein prior to repeatedly impacting the surface and a portion underneath the surface has the following properties:
a roughness value greater than about Ra 0.2 μm,
a hardness value smaller than HRc 60, and
a compressive residual stress value between about +500 and about −300 MPa at the surface.

9. The method of claim 1, wherein the bearing intermediate prior to repeatedly impacting comprises a substantial amount of micro-hair cracks at or underneath the surface.

10. The method of claim 1, wherein the resulting bearing intermediate or finished bearing product is substantially free of micro-hair cracks at or underneath the surface.

11. The method of claim 1, wherein the surface is applied a static load from about 1 N to about 500 N.

12. The method of claim 1, wherein repeatedly impacting further comprises:
vibrating the impacting tip at a dynamic load from about 2 N to about 1000 N, while contacting with the surface.

13. The method of claim 1, wherein the impacting tip is repeatedly impacted with a force applied in a direction having an angle with reference to the surface from about 30° to 90°.

14. The method of claim 1, wherein repeated impacting further comprises:
moving the impacting tip relative to the surface while vibrating.

15. The method of claim 14, wherein the impacting tip moves relative to the surface in a direction tangential to the surface.

16. The method of claim 14, wherein the impacting tip moves at a linear speed of from about 0.1 to about 100 m/min.

17. The method of claim 1, wherein the resulting bearing intermediate or finished bearing product comprises a pattern of dimples formed on the surface, wherein the pattern has a substantially constant pitch between two immediately neighboring dimples.

18. The method of claim 1, wherein the finished bearing product is a piece of a bearing selected from a group consisting of a journal bearing, a rolling bearing, a ball bearing, a roller bearing, a needle bearing, a radial bearing and a thrust bearing.

19. The method of claim 1, wherein repeatedly impacting the surface does not change the overall shape while changing a contour of the surface.

20. The method of claim 1, further comprising, prior to simultaneously applying, adjusting the static load and the dynamic load.

* * * * *